US012680907B2

(12) United States Patent (10) Patent No.: US 12,680,907 B2
Bell et al. (45) Date of Patent: Jul. 14, 2026

(54) BOUNDARY LAYER TESTING SYSTEM WITH ENHANCED ENTRY REGION FOR ANGULATED SURFACES

(71) Applicant: Airglide AI, Inc., Fort Lauderdale, FL (US)

(72) Inventors: David Bell, Naples, FL (US); John Dixon, Fort Lauderdale, FL (US)

(73) Assignee: Airglide AI, Inc., Fort Lauderdale, FL (US)

( * ) Notice: Subject to any disclaimer, the term of this patent is extended or adjusted under 35 U.S.C. 154(b) by 0 days.

(21) Appl. No.: 19/262,396

(22) Filed: Jul. 8, 2025

(65) Prior Publication Data

US 2025/0334479 A1 Oct. 30, 2025

Related U.S. Application Data

(63) Continuation-in-part of application No. 18/642,696, filed on Apr. 22, 2024, now Pat. No. 12,377,941, (Continued)

(51) Int. Cl.
*G01M 10/00* (2006.01)
*B63B 1/38* (2006.01)
*B63B 71/20* (2020.01)

(52) U.S. Cl.
CPC ............... *G01M 10/00* (2013.01); *B63B 1/38* (2013.01); *B63B 71/20* (2020.01); *B63B 2001/387* (2013.01)

(58) Field of Classification Search
CPC .... G01M 10/00; B63B 1/38; B63B 2001/387; B63B 1/36; B63B 71/20
See application file for complete search history.

(56) References Cited

U.S. PATENT DOCUMENTS

H56 H * 5/1986 Chandler ........................ 73/198

FOREIGN PATENT DOCUMENTS

CN 107063629 A * 8/2017 ............ G01M 10/00
CN 110672302 A * 1/2020 ............ G01M 10/00

OTHER PUBLICATIONS

Lecoffre, Yves et al. "Bubbles and microbubbles for hydrodynamic test facilities", La Houille Blanche, 104:4, 43-55, Oct. 24, 2018. (Year: 2018).*

* cited by examiner

*Primary Examiner* — Paul M. West
(74) *Attorney, Agent, or Firm* — Origins Law, LLC; Nicholas Spatola

(57) ABSTRACT

The invention provides a solution for inadequate boundary layer testing methods. The invention includes a uniquely configured multi-module concentric loop cycling water past a testing module to obtain real-time values and variables to use in CFD calculations. The invention is comprised of various sections, specifically designed to support the entire system. The system includes: one or more water reservoirs/ degassing tanks, high-capacity water pumps, water stream straightener(s), angulated entrance region including stable flow section, air induction ports, viewing ports, test modules containing test surfaces designed to measure friction and pressure of a passing water or air/water stream. The present invention includes one or more sensors on the test surface(s) that convey conditions to one or more computers that may receive, store, process and send interpretations to one or more visual monitors on or near the invention in real time.

25 Claims, 18 Drawing Sheets

Related U.S. Application Data which is a continuation of application No. 18/119,324, filed on Mar. 9, 2023, now Pat. No. 12,097,932.

(60) Provisional application No. 63/733,856, filed on Dec. 13, 2024, provisional application No. 63/599,344, filed on Nov. 15, 2023, provisional application No. 63/461,134, filed on Apr. 21, 2023, provisional application No. 63/439,306, filed on Jan. 17, 2023, provisional application No. 63/427,144, filed on Nov. 22, 2022.

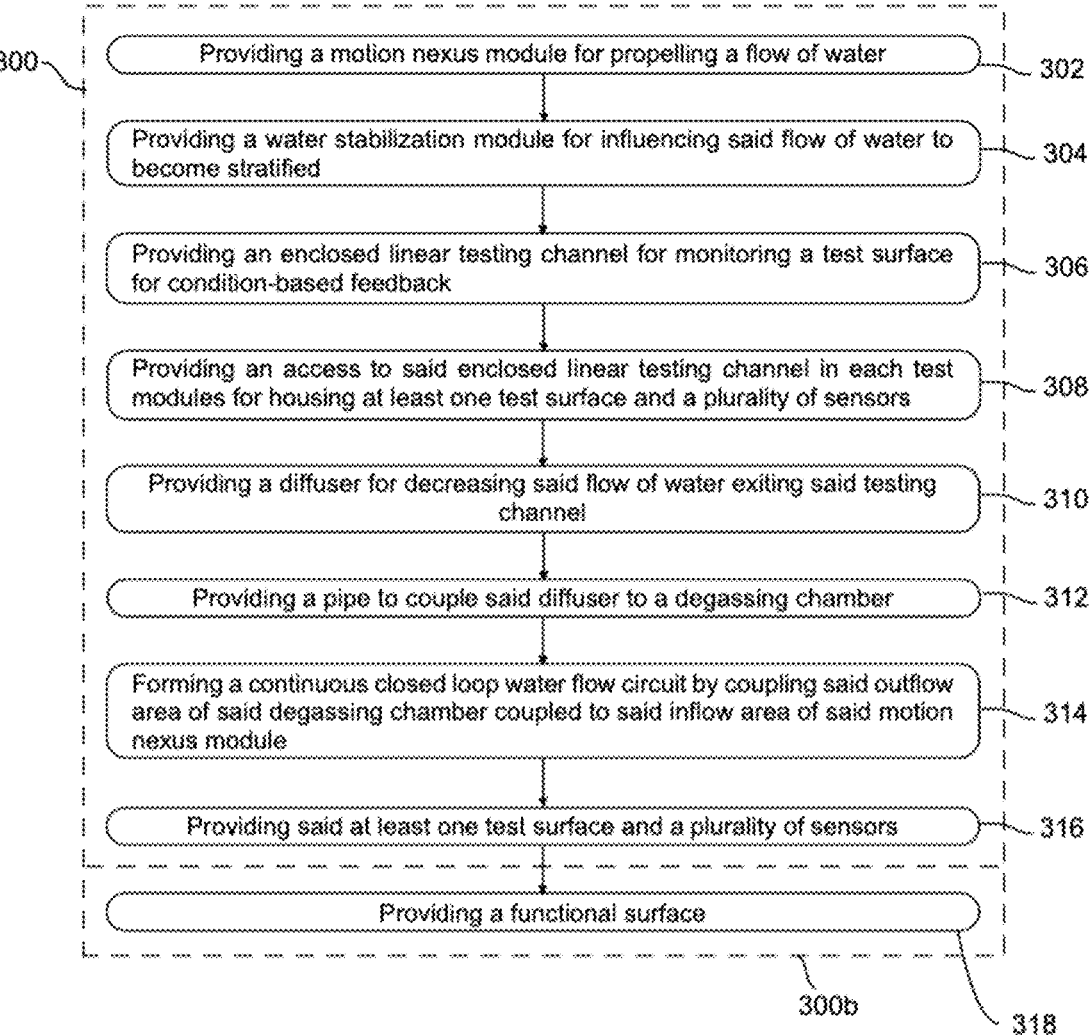

300

Providing a motion nexus module for propelling a flow of water — 302

Providing a water stabilization module for influencing said flow of water to become stratified — 304

Providing an enclosed linear testing channel for monitoring a test surface for condition-based feedback — 306

Providing an access to said enclosed linear testing channel in each test modules for housing at least one test surface and a plurality of sensors — 308

Providing a diffuser for decreasing said flow of water exiting said testing channel — 310

Providing a pipe to couple said diffuser to a degassing chamber — 312

Forming a continuous closed loop water flow circuit by coupling said outflow area of said degassing chamber coupled to said inflow area of said motion nexus module — 314

Providing said at least one test surface and a plurality of sensors — 316

Providing a functional surface

BOUNDARY LAYER TESTING SYSTEM WITH ENHANCED ENTRY REGION FOR ANGULATED SURFACES

CROSS-REFERENCE TO RELATED APPLICATIONS

This application is a continuation-in-part of co-pending U.S. patent application Ser. No. 18/642,696, entitled "System, Process, and Method for Studying Full-Scale, Multiphase, Hydrodynamic Flow Representative of a Ship's Boundary Layers," filed Apr. 22, 2024, which claims the benefit of priority under 35 U.S.C. § 119 (e) to U.S. Provisional Patent Application Ser. No. 63/461,134, filed Apr. 21, 2023, and U.S. Provisional Patent Application Ser. No. 63/599,344, filed Nov. 15, 2023, and is a continuation-in-part of U.S. patent application Ser. No. 18/119,324, entitled "A System and Method for Reducing Drag on Hulls of Marine Crafts Thereby Increasing Fluid Dynamic Efficiencies," filed Mar. 9, 2023, which claims the benefit of priority under 35 U.S.C. § 119 (e) to U.S. Provisional Patent Application Ser. No. 63/439,306, filed Jan. 17, 2023, and U.S. Provisional Patent Application Ser. No. 63/427,144, filed Nov. 22, 2022. This application also claims the benefit of priority under 35 U.S.C. § 119 (e) to U.S. Provisional Patent Application Ser. No. 63/733,856, entitled "An Internal Hydronamic Testing Module for Boundary Layer Testing System," filed Dec. 13, 2024. The foregoing applications are hereby incorporated by reference in their entireties for all purposes.

FIELD OF THE INVENTION

The present invention relates to a system, process, and method of studying full-scale, multiphase, hydrodynamic flow representative of a ship's boundary layer with the goal of enhancing fuel efficiency for marine craft.

BACKGROUND

As fuel costs fluctuate, technical leaders in the marine industry have directed watercraft design towards more energy efficient practices. Current technology implemented to solve this problem includes advanced hull shapes and designs, antifouling paints, and enhanced efficiency mechanical components. Typically, these technologies are limited to testing in Tow Tanks, cavitation tunnels, and empirically derived flat plate viscus friction. Numerous international regulatory requirements starting in 2010 have prompted the search for methods to reduce Green House Gases (GHG) by 50% between 2008 and 2030. International regulations have gone on to require existing ships to comply with the newer standard. Many newer GHG reduction technologies are not easily adapted for retrofit purposes on ships 10 to 30 years old. This makes it difficult to expedite fuel efficiency for the industry as a whole.

One practice that has resulted from this more energy efficient shift is the theory of use of air under a marine craft to provide a low frictional surface that reduces drag on the hull of the marine craft, known as hull air lubrication. However, current methods simply flood the area with air bubbles without knowing empirically the measured benefit of the technology. This method requires that an expensive system be installed and put into service to test for the desired and theoretic benefits. This leads to the ship's chief engineers turning the systems off because the use of these systems leads to more maintenance required without an obvious or perceived efficiency benefit.

Thus, a need arises in the market for an effective system capable of rigorously testing hypotheses regarding enhanced efficiencies in hull design, particularly with the incorporation of Air Lubrication System (ALS) technologies. Our previous disclosure in U.S. Ser. No. 18/642,696 encompasses a comprehensive test environment mechanism, accompanied by advanced instrumentation and monitoring capabilities, all underscored by precisely defined test parameters and their comprehensive interpretation. However, the general disclosure of the exemplary embodiments therein do not make specific structural accommodation for implementations that require testing an angulated surface. This is particularly important when testing air lubrication nozzles at the bow of a ship, where the air still travels vertically after disbursement, while the water flows past an angulated surface. Thus, it is important to be able to vary the angulation of the entrance region of the previously disclosed boundary layer testing system.

In the absence of this present invention, the ability to simulate and forecast theoretical efficiency improvements without the installation of a pioneering ALS on angulated surfaces of a vessel remains non-existent. Furthermore, no alternative methods are currently known that enable the design and testing of various angulated air lubrication nozzle configurations, culminating in a substantiated net gain in fuel efficiency.

SUMMARY OF THE INVENTION

The invention disclosed herein provides a boundary layer testing system with enhanced entry region for angulated surfaces. The boundary layer testing system with enhanced entry region for angulated surfaces includes a closed loop boundary layer test system defining a collective sequential group of modules configured for testing hydrodynamic effects on a selected specimen. The selected specimen is representative of ship hull designs and features, hull systems and coatings, or air lubrication systems, and the selected specimen is immersed continually in a liquid within the closed loop boundary layer test system.

The collective sequential group of modules configured for testing ship hull designs includes a means of delivering a fully developed flow of water onto a constructed sub-surface ship component, whereby the fully developed flow of water is defined as a stage in the flow of water where characteristics of the boundary layer do not change along a remaining length of a test channel, thereby creating a scalable model for observing and recording performance variables of the component in real time.

The collective sequential group of modules configured for testing ship hull designs further includes a means of providing a layer of gas into the controlled water stream onto the submerged ship component to evaluate an effect of the layer of compressed gas on the submerged ship component, in real time. The means of providing a layer of gas into the flow of water of the boundary layer test system further includes an angulated air delivery region sequentially following an angulated entrance region to thereby inject a gas into water. This allows the water to be single-phase or multi-layer water, converting it to a multi-phase flow of gas and water. The air delivery region in the entrance region further includes at least one interchangeable nozzle capable of allowing testing of the effects of air distribution from different air distribution nozzles on the selected specimen representative of an angulated portion of the ship hull designs immersed continually in a liquid.

The invention disclosed herein further provides an additional boundary layer testing system with enhanced entry region for angulated surfaces. This boundary layer testing system with enhanced entry region for angulated surfaces comprises additional elements in the boundary layer test system further including an electronic device. The electronic device has an input interface for receiving sensor data, a memory for storing the received sensor data and computer software, and a processor configured to execute the computer software stored in the memory.

The computer software, when executed by the processor, performs the steps of polling and recording sensor information, engaging sensors to begin collecting a first set of data, engaging accelerator of motion nexus module to begin circulating a flow of water within said collective sequential group of modules of the closed loop boundary layer test system, increasing a flow rate of said accelerator to a set velocity level, collecting a second set of data from said sensors, collecting gas humidity and gas properties, opening an airflow valve and throttling said air flow until a set air flow level is reached, collecting a third set of data from said sensors, varying water velocity for a fixed gas flow and collect a set of data from said sensors, varying gas for fixed water flow and collect a set of data from said sensors, plotting all data points, creating a nozzle operating map for said data points, and recording a tested nozzle design and tested hull surface corresponding to said data.

The invention disclosed herein also provides angulated entrance region for a closed loop boundary layer testing system. The entrance region comprises an angulated hydrodynamic stabilization area directly preceding at least one test module. The stabilization area defines an elongate angulated rectangular channel having parallel angular top planar surface and angular bottom planar surface and parallel angulated planar sidewalls. The hydrodynamic stabilization area includes a uniform geometrical shape along a length of the entrance region, wherein the length is configured to provide for settling of water flow.

The entrance region further comprises an upper boundary at the angular top planar surface configured to be in communication with said water flow to provide for testing of completely immersed underwater components. The entrance region is extended to a length of at least triple the length of said testing module to provide a stable boundary layer flow specific to ship hulls, thereby providing stabilization and a boundary layer flow that is equivalent to pipe flow.

The invention disclosed herein further provides a method for a boundary layer testing system with enhanced entry region for angulated surfaces. The method comprises providing a motion nexus module for propelling a flow of water, providing a water stabilization module for influencing said flow of water to become stratified, providing an enclosed linear testing channel for monitoring a test surface for condition-based feedback, providing an access to said enclosed linear testing channel in each test modules in said at least one test module for housing at least one test surface and a plurality of sensors, providing a diffuser for decreasing said flow of water exiting said testing channel, providing a pipe to couple said diffuser to a degassing chamber, and forming a continuous closed loop water flow circuit by coupling said outflow area of said degassing chamber coupled to said inflow area of said motion nexus module.

The motion nexus module includes a water movement device capable of propelling the flow of water. The motion nexus module includes an inflow area and an outflow area.

The water stabilization module is coupled to said outflow area of said motion nexus module and comprises a plurality of screens and diffusers. The enclosed linear testing channel includes an angulated entrance region, an angulated air delivery region, and at least one test module. The linear testing channel includes at least one area facilitating observation. The diffuser is coupled to an outflow of said linear testing channel. The degassing chamber has an inflow area and an outflow area, and a main body diameter in excess of a diameter of said pipe coupling said diffuser to said degassing chamber. The increase in diameter results in an increase in volume, which allows bubbles injected through a nozzle in said air delivery region to extricate from said flow of water.

The invention disclosed herein additionally provides a further boundary layer testing system with enhanced entry region for angulated surfaces. This boundary layer testing system with enhanced entry region for angulated surfaces provides a closed loop boundary layer test system defining a collective sequential group of modules configured for testing hydrodynamic effects on a selected specimen. The selected specimen is representative of ship hull designs and features, hull systems and coatings, or air lubrication systems. The selected specimen is immersed continually in a liquid within the closed loop boundary layer test system.

The collective sequential group of modules configured for testing ship hull designs includes a means of delivering a fully developed flow of water onto a constructed sub-surface ship component, whereby the fully developed flow of water is defined as a stage in the flow of water where characteristics of the boundary layer do not change along a remaining length of a test channel, thereby creating a scalable model for observing and recording performance variables of said component in real time. The means of delivering a fully developed flow of water onto a constructed sub-surface ship component of the boundary layer test system further includes an enclosed linear testing channel having at least one test module and a separate extended entrance region directly preceding said at least one test module, wherein said extended entrance region defines an elongate rectangular channel having parallel horizontal top and bottom planar surfaces and parallel vertical planar sidewalls.

The collective sequential group of modules configured for testing ship hull designs also includes a means of providing a layer of gas into the controlled water stream onto the submerged ship component to evaluate an effect of said layer of compressed gas on said submerged ship component, in real time.

It is an object of the present invention to provide a system that efficiently uses the principles of fluid dynamics to maximize the efficiency of the watercraft by testing and measuring outcomes as compared to theories of reducing water drag on a submerged angulated ship surfaces.

It is yet another object of the present invention to provide empirical data that can either corroborate or challenge the projected efficiencies of various devices, air lubrication nozzles, coatings, or other systems that impact a ship. This scope extends to, but is not restricted to, systems such as air lubrication, coatings like paint and cladding, composite materials, and the influence of biologic growth. Through rigorous experimentation and analysis, the invention seeks to contribute substantiated insights into the effectiveness of these components and systems in enhancing the overall performance and fuel efficiency of marine vessels.

It is a further object of the present invention to establish a comprehensive method and process for the real-time testing, recording, and observation of an air lubrication system. This approach aims to facilitate the dynamic assessment of air lubrication systems, enabling researchers and practitioners to gather immediate and accurate data pertaining to the performance and effects of these systems. By offering a real-time perspective, the invention empowers the optimization of air lubrication technologies for the advancement of fuel efficiency and hydrodynamic performance in marine crafts.

The drawings and specific descriptions of the drawings, as well as any specific or alternative embodiments discussed, are intended to be read in conjunction with the entirety of this disclosure. The invention may be embodied in many different forms and should not be construed as being limited to the embodiments set forth herein; rather, these embodiments are provided by way of illustration only and so that this disclosure will be thorough, complete, and fully convey understanding to those skilled in the art. The above and yet other objects and advantages of the present invention will become apparent from the hereinafter set forth Brief Description of the Drawings, Detailed Description of the Invention, and Claims appended herewith.

BRIEF DESCRIPTION OF THE DRAWINGS

FIG. 18 illustrates a flow chart of a method for the testing system.

DETAILED DESCRIPTION OF THE INVENTION

Figure 1:
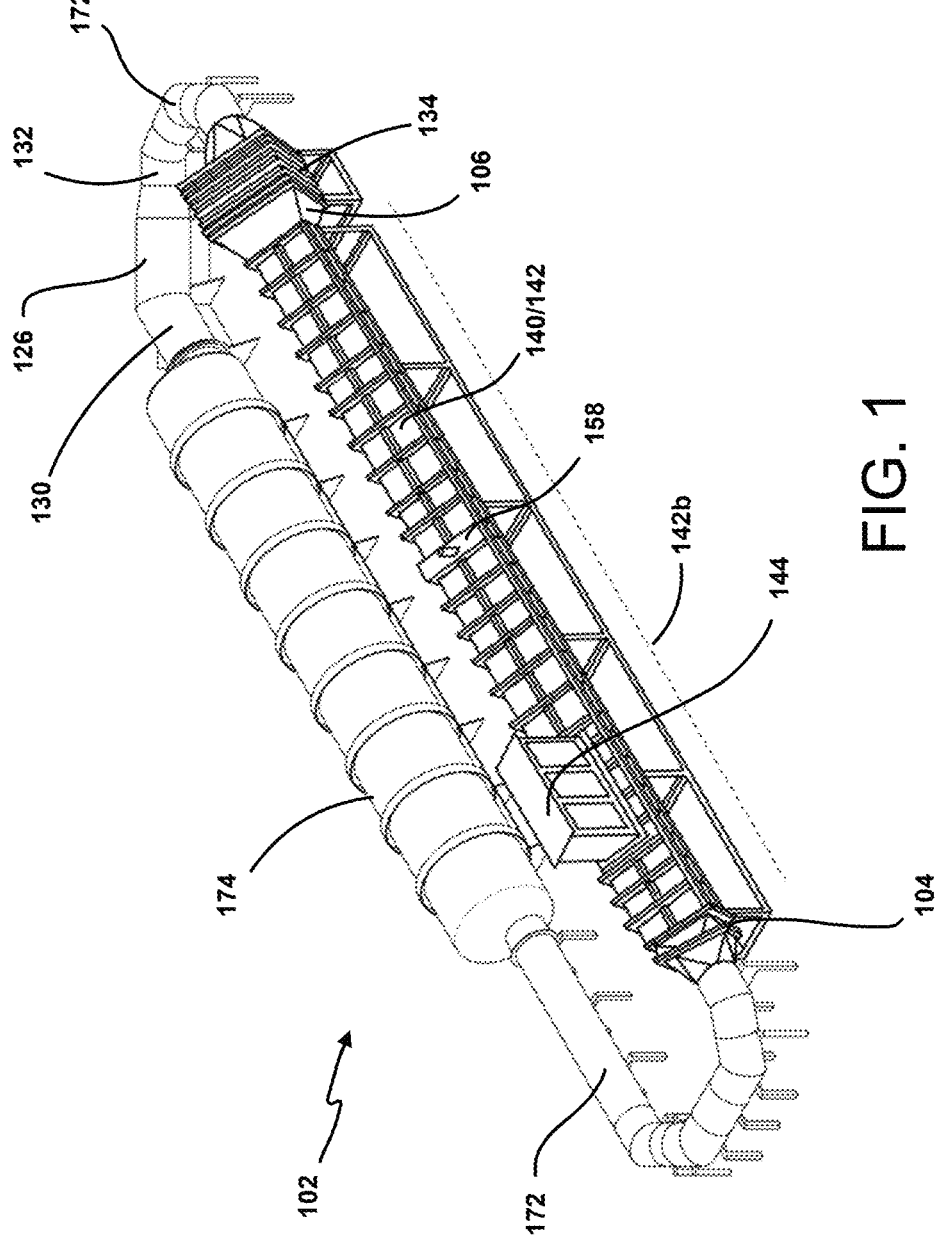
FIG. 1 illustrates an isometric view of an embodiment of the testing system.

The invention herein provides a solution for inadequate boundary layer testing methods, described above, and in particular, testing on angulated submerged surfaces. The invention includes a uniquely configured multi-module concentric loop cycling water past a testing module to obtain real-time values and variables to use in CFD calculations capable of solving the above issues. The invention incorporates a system that can replicate the conditions experienced by a submerged angulated ship surface, in a controlled moving water stream. This disclosure introduces a design to measure the effects on a ship hull when supplying air to the underside of said ship's hull. Currently, the only other method of analyzing the theoretical efficiency of an ALS is to install a full-scale working system on a ship and conduct sea trials to measure actual changes in said ship's fuel usage, a very expensive and invasive proposition. The present invention includes a uniquely configured system and test surface capable of solving the above issues while still in the theory and testing phases.

The benefit of this invention is the ability to test predictions and various theories of ship hull design that may involve emerging technology such as ALS and other modifications influencing a vessel's efficiency while underway and in real time. The efficiency value of confirmed testing is realized as lower fuel usage, less carbon emissions, simplified hull maintenance and ultimately lower operating costs.

Unique properties are incorporated into the construction of the present invention such as a racetrack design, which provides a continuous looped stream of controlled water flow to the test surface. The present invention is designed to conduct ship hull design experiments in a variety of conditions and has the capacity to measure and record the data generated by said experiments.

Current methods of obtaining such data are typically performed through repeated tow tank testing, however, tow tank testing typically utilizes a traveling carriage and a wake-making arm with sensors on it connected to a scaled hull body of a ship to measure the drag and pressure caused by different hull designs and configurations. However, a tow tank is limited in its ability to test frictional viscus drag due to the obsolescence of the design standards and assumptions dating back to the International Tow Tank Conference (ITTC) of 1978. The standards of the ITTC 1978 have not been updated to consider more recent developments such as ducted nozzle propellers, rotating Azimuth pod propellor modules, or air lubrication systems.

An alternative to a tow tank is a cavitation tunnel. A cavitation tunnel fixes the scale model while circulating the water which allows for enhanced study of flow around the scale model useful for the study of ship appendages, propellers, submersed bodies, etc. The cavitation tunnel also suffers from inability to scale friction viscous drag.

In a cavitation tunnel, the water flow can be precisely controlled and adjusted and observed through a wide range of flow velocities, pressures, and turbulence levels. This level of control allows researchers to create realistic and repeatable flow scenarios that closely mimic the actual operating conditions of the object being tested. In contrast, a tow tank test may have limitations in achieving a detailed observation of the scale body and no ability to measure or scale wave making resistance. Cavitation tunnels offer a higher degree of repeatability in testing. Controlled and consistent flow conditions enable researchers to repeat experiments with minimal variations, making it easier to analyze the effects of different degrees of friction and pressure on a scale model. Tow tank tests may have more variability due to external factors and the difficulty of maintaining constant flow conditions. The geometry of cavitation tunnels lend themselves to being specifically designed to study cavitation phenomena, which involve complex interactions between flow and pressure. These tunnels allow researchers to visualize and analyze cavitation effects accurately, providing insights into how varying friction and pressure impact cavitation patterns and performance.

Cavitation tunnels can achieve higher Reynolds numbers, which are important for accurately simulating full-scale flow conditions. Higher Reynolds numbers allow researchers to better study turbulence effects and assess how varying friction and pressure impact the overall flow behavior.

Unwanted bubbles exist in both tow tanks and cavitation tunnels. Cavitation tunnels typically incorporate bubble traps and mechanisms to minimize the presence of air bubbles in the water flow. This ensures that the effects of friction and pressure variations on the scale model are not impacted by unwanted bubble interference, which can be more challenging to control in tow tanks. However, a controlled bubble supply may be ideal for certain testing, such as experiments testing the degree of efficiency of surfaces treated with an air lubrication system. While Cavitation tunnels may achieve a stable single-phase flow (no bubbles), there is no mechanism for a poly-phase flow (including a carefully controlled air/bubble supply). Rather, the overall construction of a cavitation tank typically utilizes a vertical construction to facilitate the opposite. The vertical orientation reduces bubble interface and presence of unwanted bubbles in the water flow. Bubbles tend to accumulate at the top of the loop, in the test section, which allows for a cleaner and less contaminated bubbly water flow in the region where testing occurs. This provides for testing of completely submerged surfaces, such as propellers and props, but is limited for other testing scenarios with an increase in complex testing conditions.

Therefore, when testing applications requiring air, such as air lubrication, one practice that has become common is the application of a method that simply floods the test area on an actual ship with air bubbles without knowing empirically the measured benefit of the technology. This method requires that an expensive system be installed and put into service to test for the desired and theoretic benefits. This leads to ship engineers turning the systems off because the use of these systems leads to more maintenance required without an efficiency benefit.

Our previous disclosure solves these problems and bridges the gap in current available technology by introducing a closed loop system with several modules specifically configured to switch between single-phase and multi-phase flow. Specifically, the modules include a propulsion module, referred to as the motion nexus module for its ability to accelerate a flow from rest, and continue as a pass-through module keeping the flow continuous. One or more high-capacity pumps, water towers, propellers, and/or drives will provide the desired pressure and or volume for the test parameters.

However, when performing tests on angulated surfaces, additional considerations must be taken. Namely, in our previous disclosure, the implementation mimics the flat bottom of a ship hull, having a generally flat horizontal testing surface. The orientation of the rectangular entrance region becomes unacceptable when testing angulated surfaces. For example, if air is disbursed from an ALS nozzle on an angulated surface, such as the V-shape of at the bow section of a ship, the air travels vertically upwards as it travels back. In order to test nozzle variations capable of providing a uniform air disbursement on a non-flat surface, a boundary layer testing lab needs to have an angulated testing surface and angulated air injection nozzle, while still maintaining the normal forward flowing water. This invention solves this issue by providing an angulated entrance region, wherein the testing surface and air injection nozzle each reflect the actual angulation of the ship surface. Angulation may be adjusted to achieve an accurate angulation, which may be adjusted on a ship-by-ship basis (in a range of angulation from greater-than-zero degrees to less-than-ninety degrees relative to a horizontal surface). For continuity, each reference to the entrance region and extended entrance region should be construed as angulated entrance region.

The invention also includes an angulated nozzle which accelerates flow and a flow control that includes screen and diffusers to help stabilize the flow. This creates a positive stable flow that is sometimes called a laminar flow, though it may not be hydrodynamically laminar, but rather a stratified flow, or a flow with no rotation or angular motion. Once the flow exits the nozzle module in a stratified flow, it enters the entrance region, which is extended to stabilize the boundary layer flow further before it reaches the test modules. Further stated, the system includes a fluid stream straightener within a water conveyance feature (piping) will remove rotation and angular motion from the water that has left the de-bubble tanks and create an accurate representation of water flow along the hull surface of a ship underway. A parallel flow section receives straightened water from the stream straightener and further removes any residual rotation and angular motion before passing one or more air injection and/or viewing ports. Gases such as atmospheric air can be injected into the water stream ahead of the test subject and test plate, to measure the drag or frictional resistance on the test plate or subject. Cavitation tunnels are typically short and are not capable of achieving this stable flow where the boundary layer is fixed and non-changing. The extension in length of this entrance region provides a stable and non-changing boundary layer pipe flow specific for ship hulls. The entrance region can also be thought of as a test channel, and can be airtight, or pressurized.

Pipe flow, in hydrodynamic terms, refers to the movement of a fluid (like water or oil) through a pipe where the thickness and velocity profile of the boundary layer is unchanged. This process is governed by a set of physical principles and equations that describe how fluids behave under various conditions. This can be broken down into several key concepts, as discussed below.

Laminar and Turbulent Flow: There are two primary types of flow in pipes-laminar and turbulent.

Laminar Flow: This occurs when a fluid flows in parallel layers, with no disruption between the layers. It's characterized by smooth, orderly fluid motion and typically happens at lower velocities. Mathematically, laminar flow is described when the Reynolds number (a dimensionless number that predicts flow patterns in fluid dynamics) is less than 2100.

Turbulent Flow: In contrast, turbulent flow is chaotic and occurs at higher velocities. Here, the fluid undergoes irregular fluctuations and mixing. Turbulent flow is predicted when the Reynolds number exceeds 4000.

Reynolds Number: This is a crucial concept in pipe flow, defined as: $Re=(\rho vD)/\mu$, where $\rho$ is the fluid density, v is the velocity of the fluid, D is the diameter of the pipe, and $\mu$ is the dynamic viscosity of the fluid. The Reynolds number helps in determining whether the flow is laminar or turbulent.

Bernoulli's Equation: This principle states that an increase in the speed of a fluid occurs simultaneously with a decrease in pressure or a decrease in the fluid's potential energy. In pipe flow, this means that if the fluid's velocity increases, the pressure within the fluid decreases, and vice versa.

Pressure Loss and Head Loss: As fluid moves through a pipe, it experiences resistance due to friction along the pipe walls and any fittings or bends in the pipe. This resistance leads to a loss of pressure and head (energy per unit weight of fluid). Darcy-Weisbach and Hazen-Williams are among the formulas used to calculate these losses.

Viscosity: This is a measure of a fluid's resistance to flow. Fluids with high viscosity (like oil) flow more slowly and have a greater resistance to flow than those with low viscosity (like water).

Continuity Equation: In pipe flow, the mass flow rate must remain constant from one cross-section of the pipe to another, assuming the flow is steady. This is expressed by the equation $A_1V_1=A_2V_2$, where A is the cross-sectional area of the pipe and V is the fluid velocity.

Wall Shear Stress: This is the force per unit area exerted by the fluid on the pipe wall, causing friction and contributing to pressure loss. Understanding these concepts is crucial in designing efficient piping systems in various engineering fields, from water supply to oil and gas pipelines. Each factor plays a role in determining how a fluid will behave as it moves through a pipe, affecting factors like flow rate, pressure drop, and energy consumption.

Regarding pipe flow when the boundary layer becomes fixed: When discussing pipe flow where the boundary layer becomes "fixed" or fully developed, we're typically referring to a stage in the flow where the characteristics of the boundary layer, the thin layer of fluid in contact with the pipe wall, do not change along the length of the pipe. This concept is significant in understanding the dynamics of fluid flow in pipes.

Development of Boundary Layer: In the initial part of the pipe, right after the fluid enters, the boundary layer starts to develop. This is known as the entrance region or developing flow region. In this region, the boundary layer grows in thickness from the pipe wall inward towards the center of the pipe.

Fully Developed Flow: After a certain length, the boundary layer stops growing and reaches a steady state. This is known as the fully developed region. In this region, the velocity profile (the variation of fluid velocity across the pipe diameter) becomes stable and does not change along the length of the pipe.

Characteristics of Fully Developed Flow:

Velocity Profile: In laminar flow, the velocity profile is parabolic, meaning the fluid moves faster in the center of the pipe and slower near the walls. In turbulent flow, the profile is flatter due to mixing, with a sharp decrease in velocity very close to the walls.

Constant Shear Stress: The shear stress at the pipe wall becomes constant along the pipe's length. This means that the frictional forces exerted by the fluid on the pipe wall are uniform.

Pressure Drop: In the fully developed region, the pressure drop per unit length becomes constant. This is because the forces due to friction are balanced by the pressure forces in the flow direction.

Mathematical Modeling: In the fully developed flow region, the Navier-Stokes equations, which describe the motion of fluid substances, simplify considerably. For example, in the case of steady, incompressible, fully developed laminar pipe flow, the axial velocity only varies radially and the pressure gradient is constant.

Practical Implications: Understanding when the flow becomes fully developed is important in engineering applications. It allows for more accurate calculations of pressure drops and flow rates, which are essential for the design and analysis of piping systems. In summary, when the boundary layer in a pipe flow becomes fixed or fully developed, it signifies a point where the flow characteristics stabilize and become consistent along the length of the pipe. This concept is fundamental in fluid dynamics and has practical implications in the design and operation of various fluid transport systems.

The invention comprises designated test areas, which can be represented by a test module or similar component. These test areas grant access to the test channel, thereby facilitating the examination of specific parts or components. In certain instances, the test module might be positioned atop the test channel and incorporate mechanisms for observing the test area. Such mechanisms may encompass features like windows, cameras, or other electronic instruments through which observations are systematically captured and presented within an electronic medium, often displayed on a computer monitor. A testing module may include one or more test plates positioned upstream and/or downstream of air injection/viewing ports. Within the test module, these test plates serve as surfaces sensitive to friction and pressure, aptly referred to as "test plates." In scenarios involving extended test subjects, multiple test plates can be strategically arranged longitudinally in alignment with the fluid flow direction. This configuration facilitates the meticulous measurement and recording of the drag and resistance effects along the extended length of the test subject. The test subject material or treatment can be affixed to the water-facing side of the testing plate. Within the invention's confines, water is pressurized and guided to flow past the test subject. This fluid movement triggers a frictional resistance that is quantified by the test plate. A transparent side wall integrated into the channel construction further enables real-time visualization of the test subject itself, the flowing water's interactions with the test subject, and the introduction of air into the water flow, thereby influencing the dynamics of the test subject's behavior.

Because the entrance region channel is angulated, a sealed or substantially sealed text plate is necessary to avoid harmonic resonance of flowing water past the non-hydrodynamic blunt surfaces of the interior of the testing module. By sealing the test plate to the angulation of the entrance region, the flow will remain uninterrupted, which is something existing cavitation tunnels cannot accomplish.

The method for validating the effectiveness and accuracy of the tests will consider the dimensions, mass and buoyancy of the test subject. Computational Fluid Dynamics (CFD) can be used to form an expected outcome. This invention can confirm or correct the theoretical data with real time empirical data, as it relates to a given test subject or feature. Once a test subject's fluid drag and resistance data is collected from a fluid stream only operation, an air flow will be introduced into the fluid stream, upstream of the test subject and test plate. The test subject will then be monitored again to track changes in drag and friction from the baseline test.

The sensors on the test plates within the test module may convey data to one or more computers to store and analysis. Interpreted data from one or more of the mentioned input/output devices (computers) will be transferred to a monitor to allow real time viewing of test results. A panel may be located near a person operating a control panel that controls the various functions and operations of a test event, such as water flow, air flow volume and pressure, water flow volume and pressure and pump on/off control.

These test areas may be selectively accessible, so that the module may be opened, and a new test surface may be included. Further, this access also allows different sensors and testing equipment to be swapped out and configured uniquely for the requirements of each specialized test scenario without interfering with the flow; a feature that is not present in current testing apparatuses.

This invention discloses a way to actively test and view the performance of various sub-surface design features meant to increase the efficiency of a ship's hull, including but not limited to ALS. A major feature of this invention is the ability to view and receive data in real time. The system and method of the present invention may be used to test and prove a system that efficiently uses the principles of ship design, including the addition of air lubrication to maximize the efficiency of the watercraft by reducing drag on the hull. The present invention may be used to provide data on the performance of various hull coatings and/or air lubrication systems to enhance a ship's water repellant characteristics while underway. Multiple tests with varying conditions and parameters will be conducted on any unique test plate or subject collecting data to determine an optimal configuration or design feature.

A diffusion module is positioned sequentially behind the entrance and test region to slow down the flow before the flow enters the degassing chamber. The degassing chamber allows the gas to expand out of the water, which helps control the rate, flow, and type of bubble that is carefully calibrated into the system. However, the degassing chamber may be optional in some installations, such as those with special limitations.

One or more water reservoirs/degassing chambers (debubble tanks) will store and collect water used to maintain a steady stream to create a current used in testing a hull model or feature.

In general, the invention may be constructed of but not limited to non-corroding materials, such as aluminum or Fiber-Reinforced Plastic (FRP). Further, the as-built dimensions of the invention will be determined by the size of a test feature, number of test features to be tested and desired fluid velocity rates to be tested. This invention is not limited to specific dimensions in length, width, height, fluid volumes, velocities or pressures.

The boundary layer testing system with enhanced entry region for angulated surfaces of the present invention may be used to provide a system that efficiently uses the principles of fluid dynamics to maximize the efficiency of the watercraft by testing and measuring outcomes as compared to theories of reducing water drag on an angulated submerged ship surface. The system may also be used to provide empirical data to support or refute the predicted efficiencies of a device, coating or system affecting a ship, including but not limited to air lubrication systems. The system also provides a method and process of testing, recording and/or observing an air lubrication system in real time. The invention can be used to test the friction reducing effect of air flowing against angulated surfaces of a ship. Further, the invention can be used to test 3-dimensional features including but not limited to surface coatings and surface treatments based on theoretical concepts prior to costly installation on a ship. This system is particularly shown in FIGS. 1-16, and the methods in FIGS. 17-18.

FIG. 1 illustrates an isometric view of an embodiment of the testing system 102, and shows the sequential group of modules 126/134/140/144/174 that make up the system, including the motion nexus module 126, water stabilization module 134, angulated enclosed linear testing channel 140 with angulated entrance region 142, angularly mounted test module 144, and degassing chamber 174.

Figure 2:
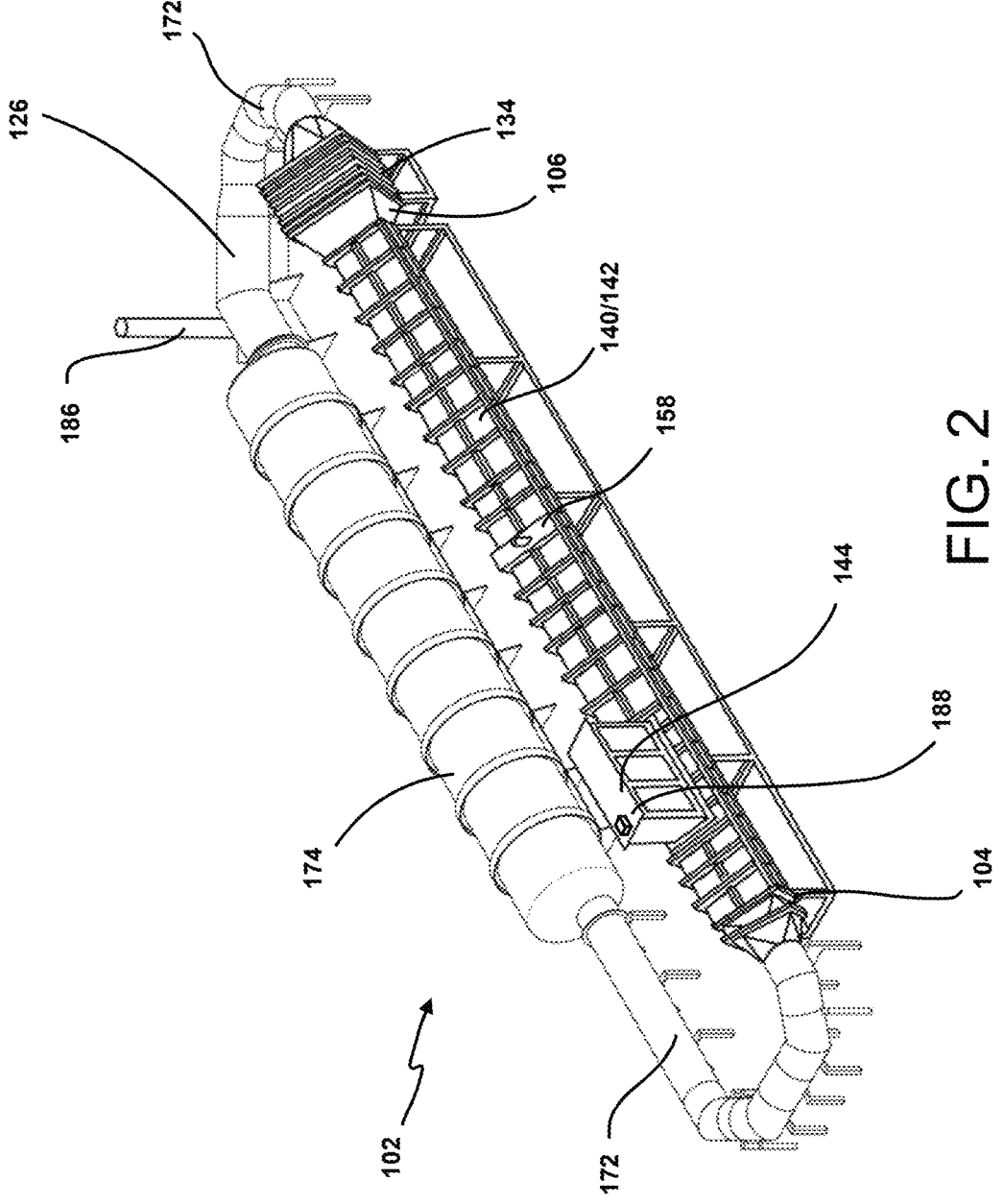
FIG. 2 illustrates an isometric view of an embodiment of a concentric testing system with a water tower.

FIG. 2 illustrates an isometric view of an embodiment of a concentric testing system 102 with a water tower 186. The figure features a water tower 186 for supplying additional water pressure and enabling the emulation of varying factors, including head pressure fluctuations, hydrostatic pressure, hull draft, design draft, and simulation pressure. The water tower 186 provides a means to store water at a height sufficient to pressurize the system, allowing for the simulation of various pressure conditions. Alternatively, a stand pipe can be used in place of the water tower if the user requires a more standardized pressure. A stand pipe is a vertical pipe connected to the system that allows for fluid expansion and contraction while maintaining a constant pressure. The choice between a water tower and a stand pipe depends on the specific requirements of the test system and the desired pressure conditions. Additional pressure may be created via velocity; however, it is argued and contended an inaccurate representative of static head pressure.

Figure 3:
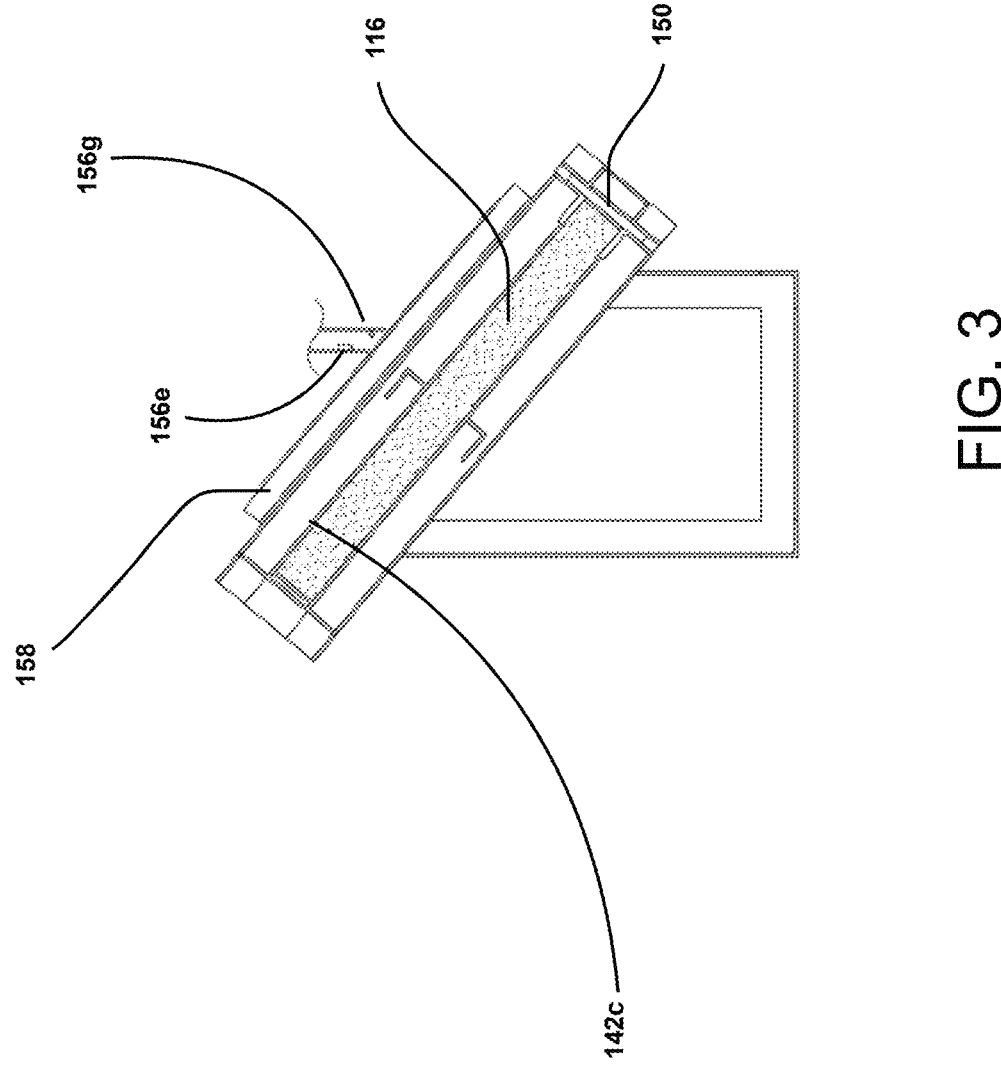
FIG. 3 illustrates a cross-sectional side view of the angulated entrance region of the testing system.
Figure 4:
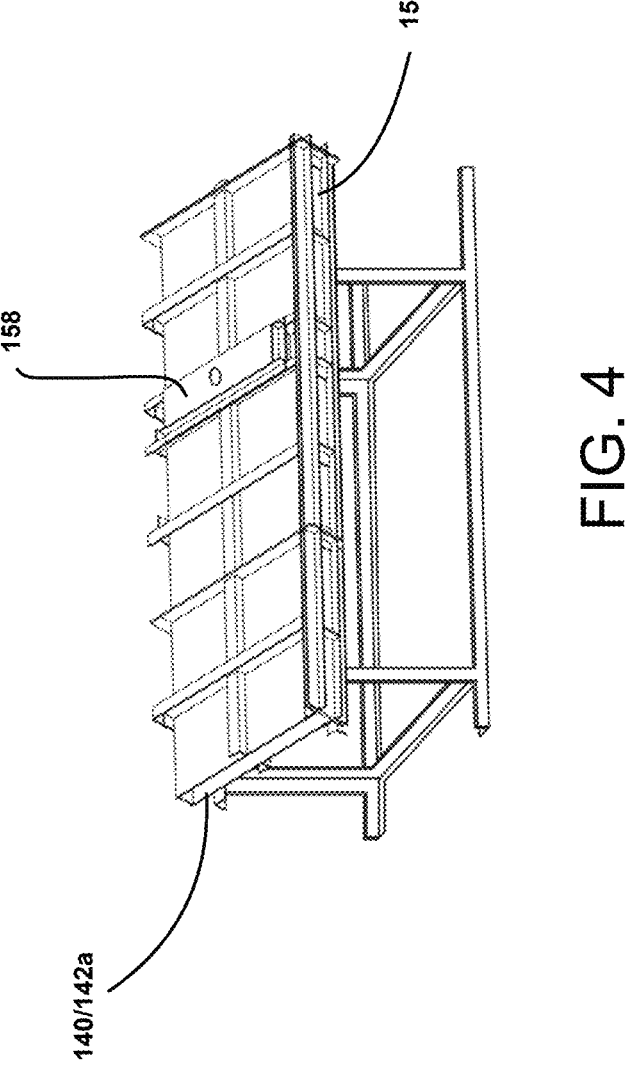
FIG. 4 illustrates an isometric view of an air delivery module and the angulated entrance region of the testing system with installed air inflow nozzle.
Figure 5:
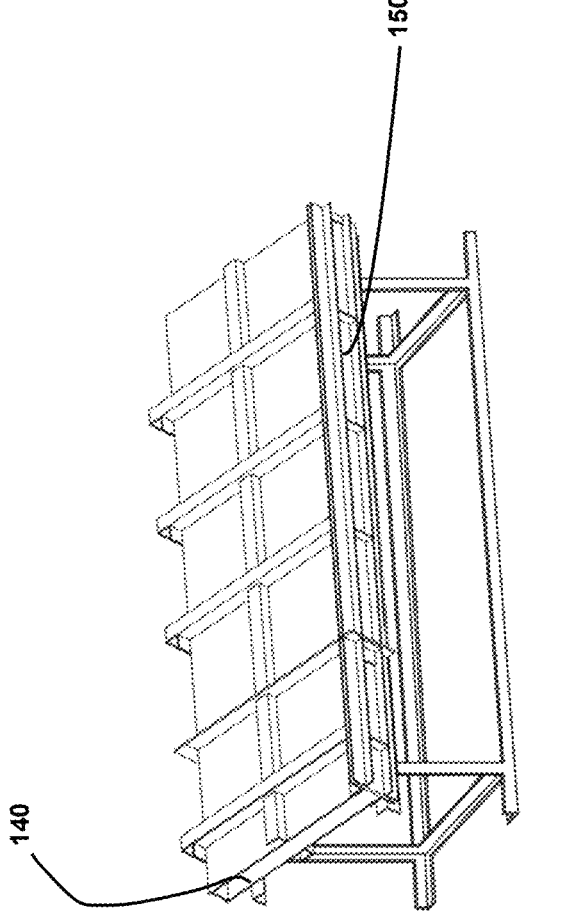
FIG. 5 illustrates an isometric view of a module of the angulated entrance region of the testing system.
Figure 6:
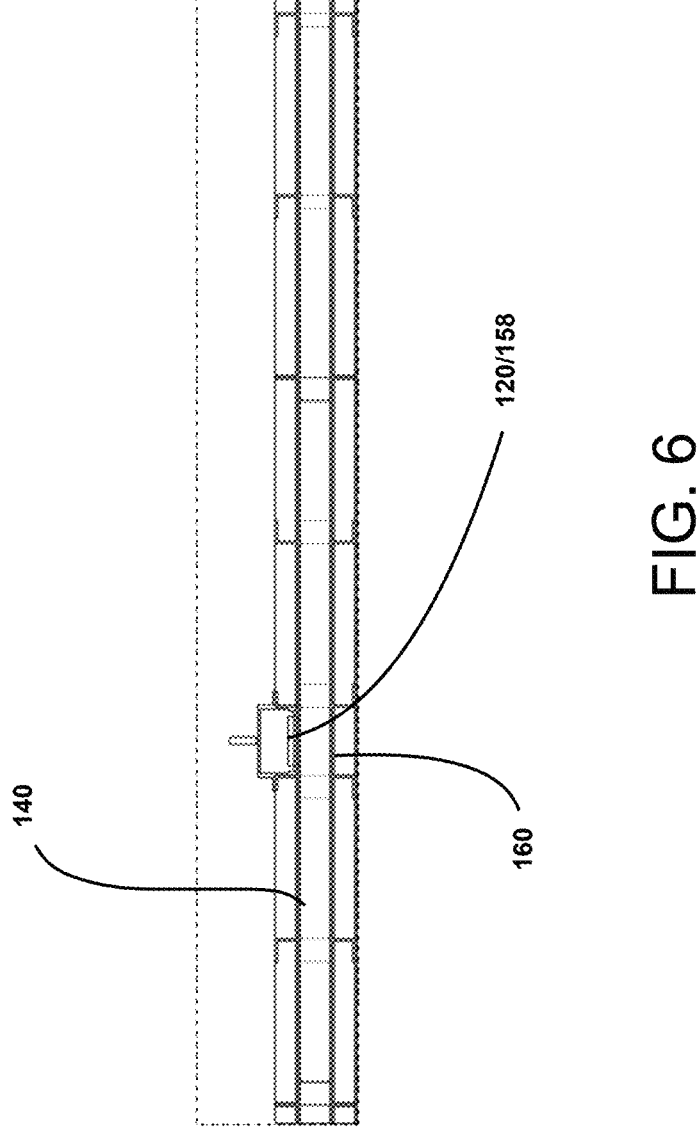
FIG. 6 illustrates an isolated enlarged cross-sectional side view of a module of the angulated entrance region of the testing system with installed air inflow nozzle.
Figure 7:
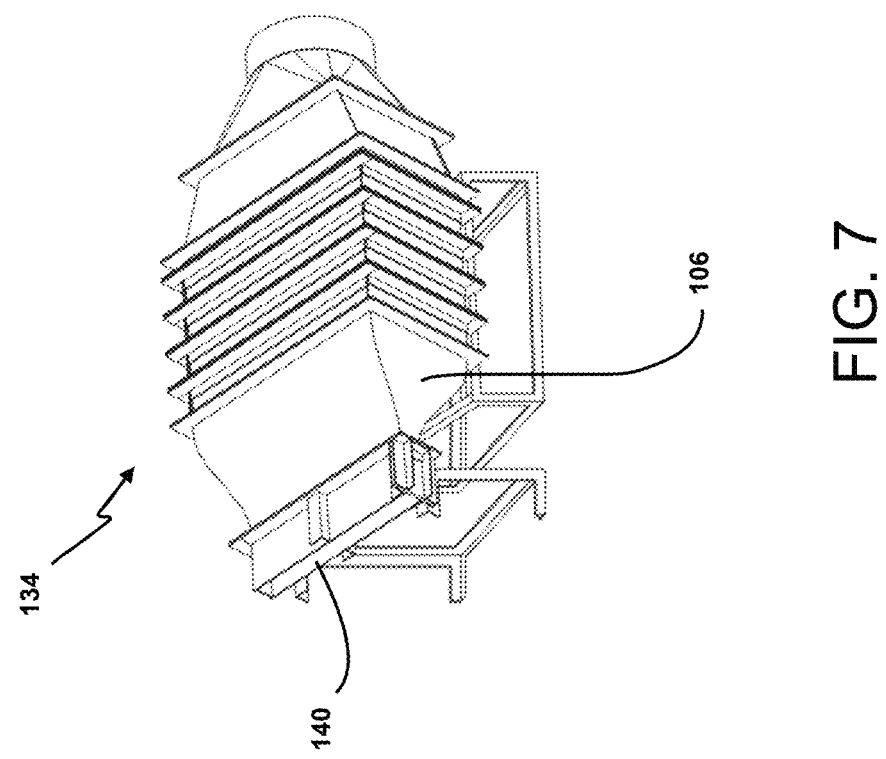
FIG. 7 illustrates an isometric view of the angulated diffuser module of the testing system.
Figure 8:
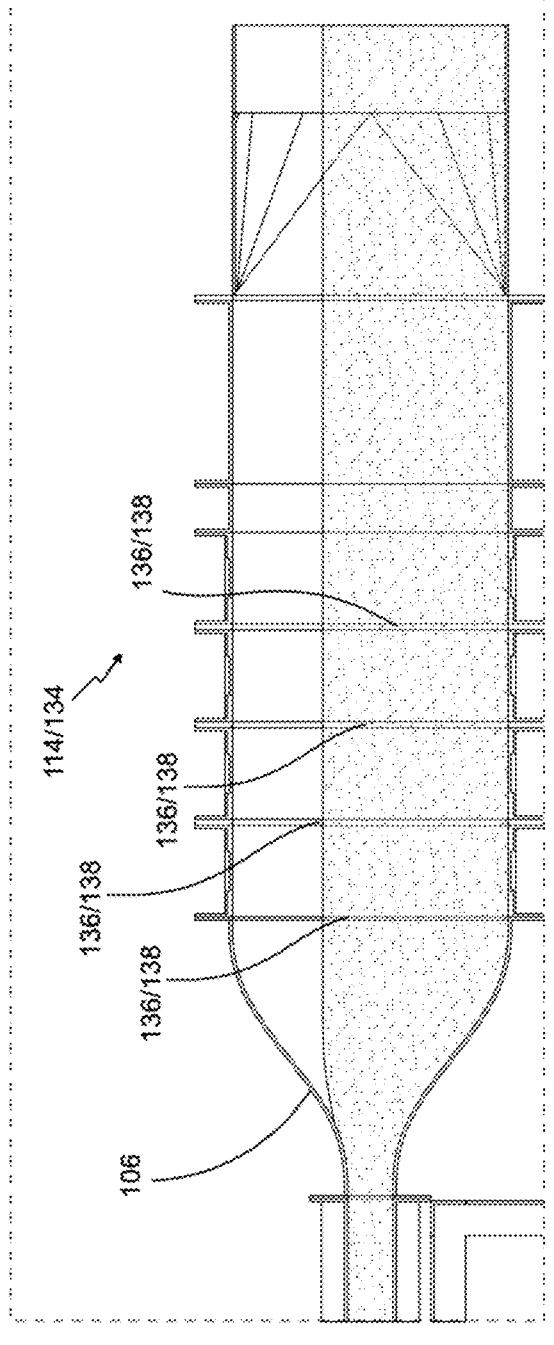
FIG. 8 illustrates an isolated enlarged cross-sectional side view of the diffuser module of the of the testing system.
Figure 9:
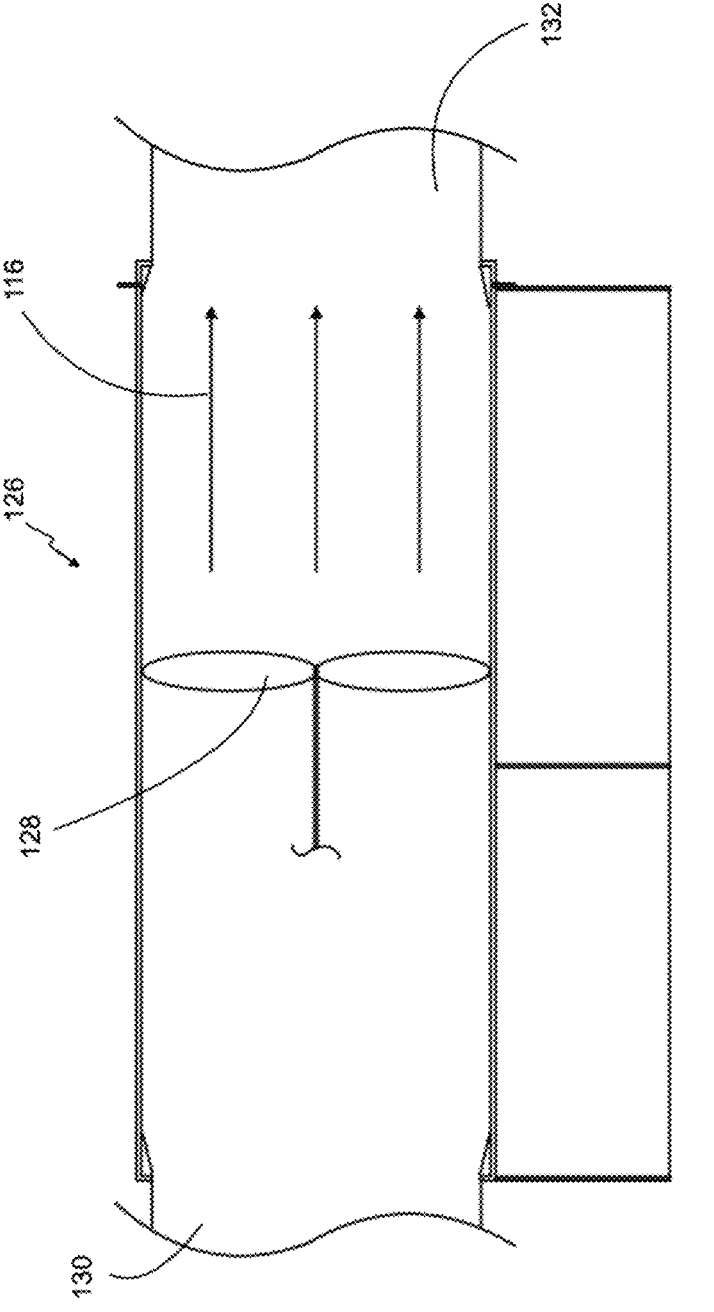
FIG. 9 illustrates a cross-sectional side view of the motion nexus module of the of the testing system.
Figure 10:
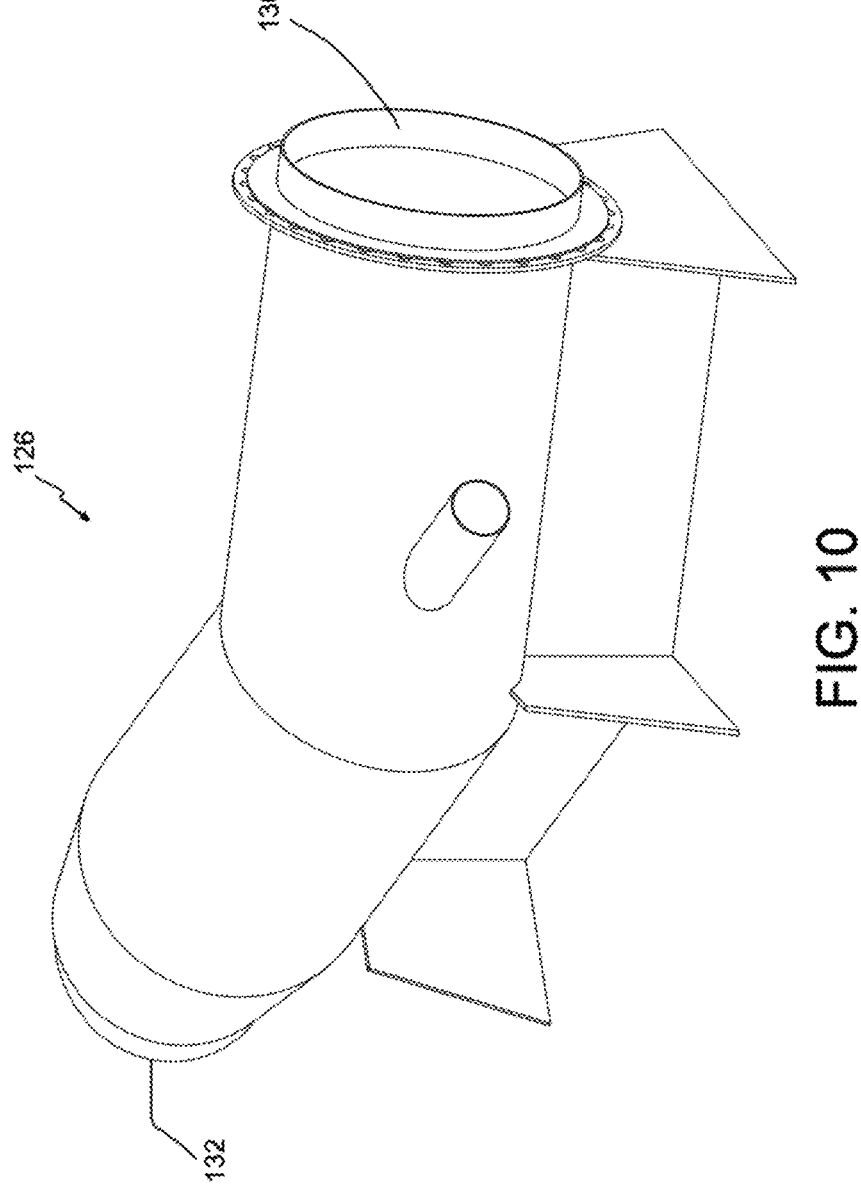
FIG. 10 illustrates an isometric view of the motion nexus module feeding into the diffuser module of the of the testing system.
Figure 11:
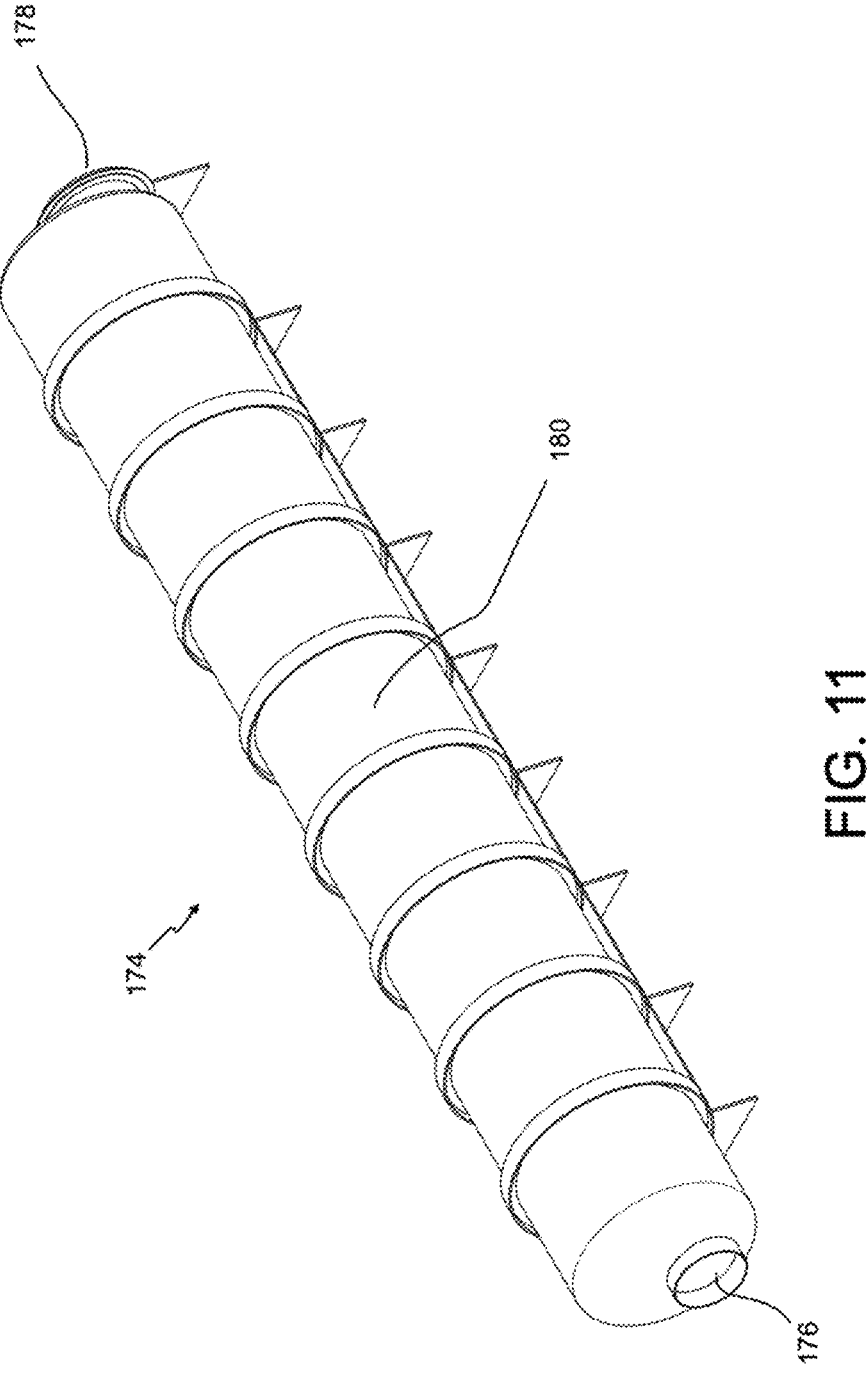
FIG. 11 illustrates an isometric view of the degassing chamber of the testing system.
Figure 12:
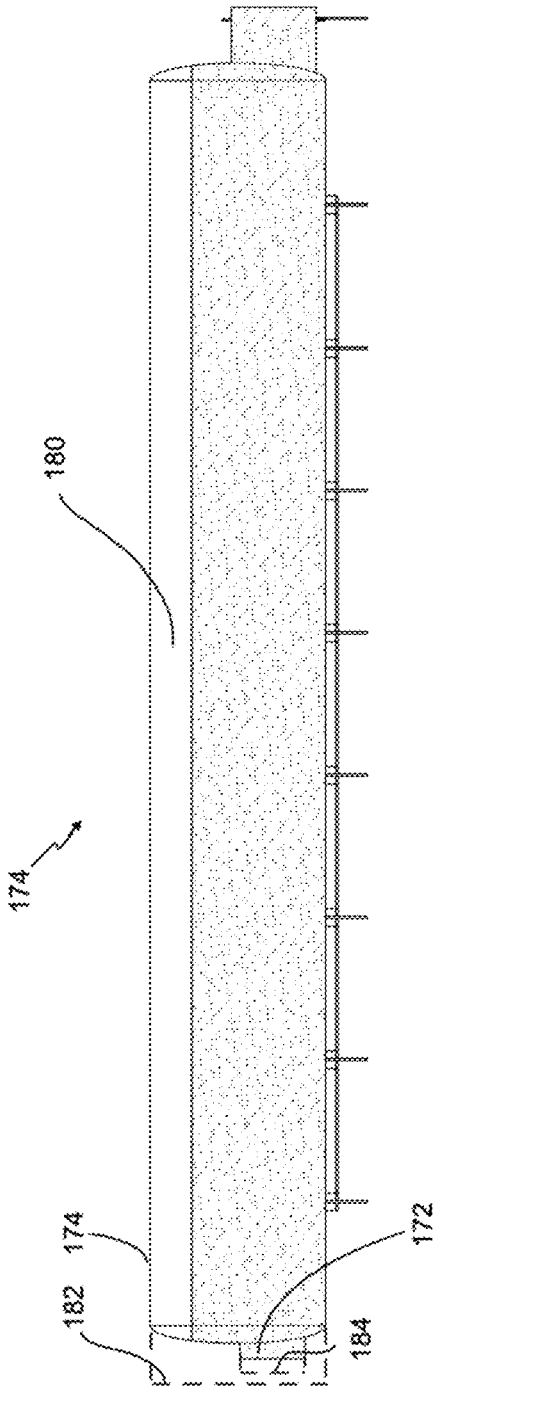
FIG. 12 illustrates a cross-sectional side view of the degassing chamber of the testing system.
Figure 13:
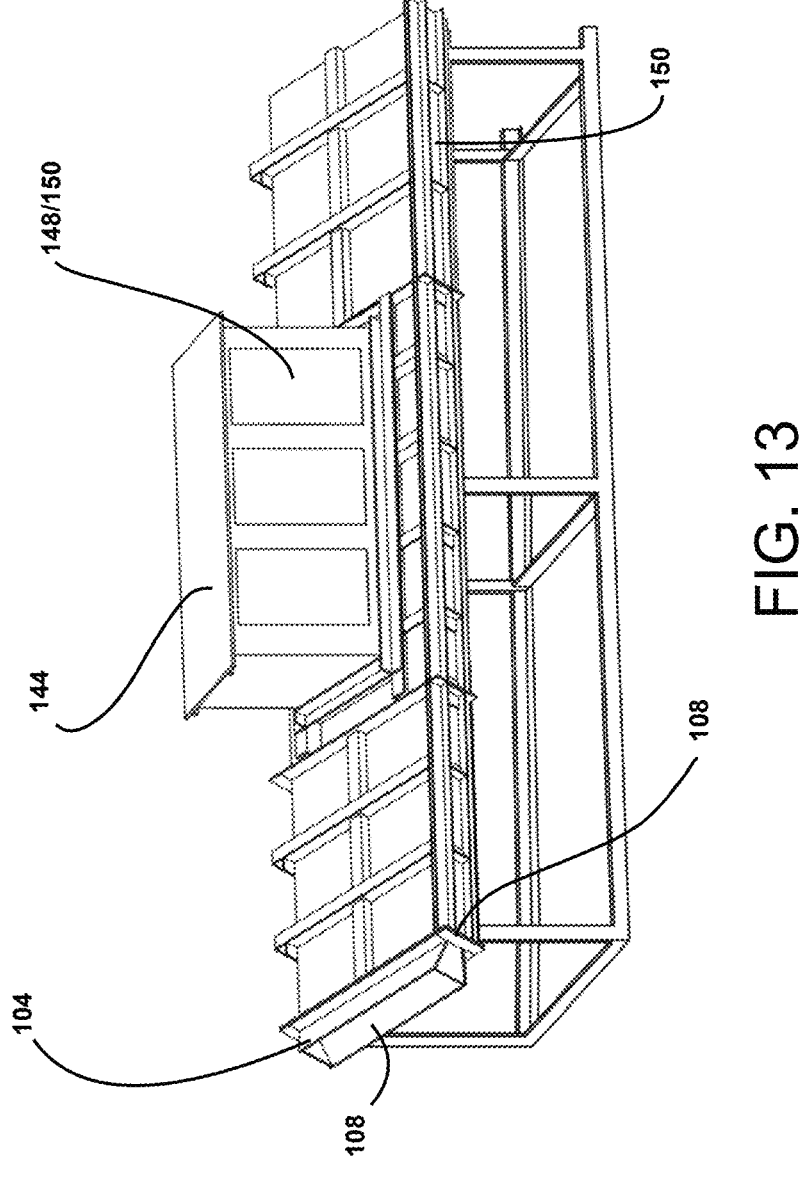
FIG. 13 illustrates an isometric view of a testing module on an angulated entrance region.
Figure 14:
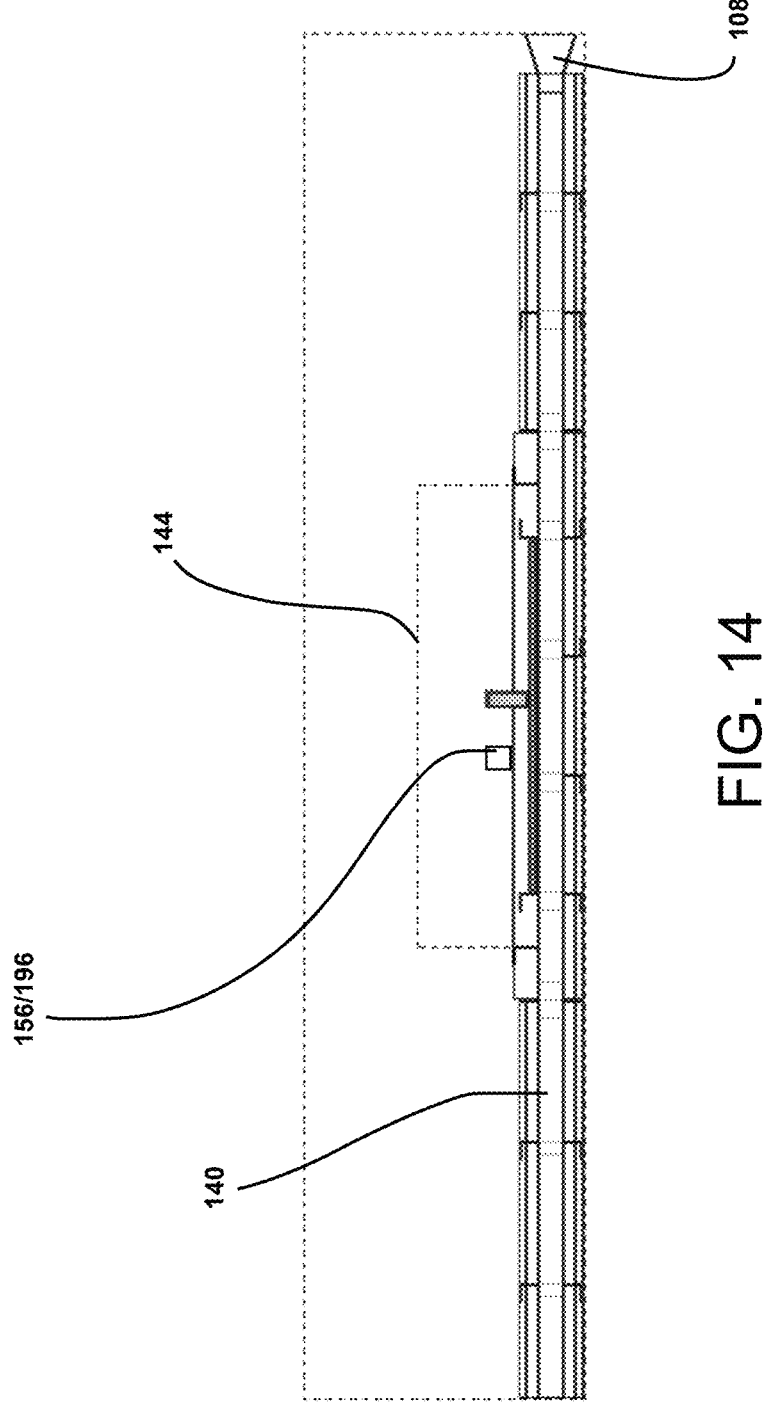
FIG. 14 illustrates an isolated enlarged cross-sectional side view of a testing plate in the testing module on an angulated entrance region.
Figure 15A:
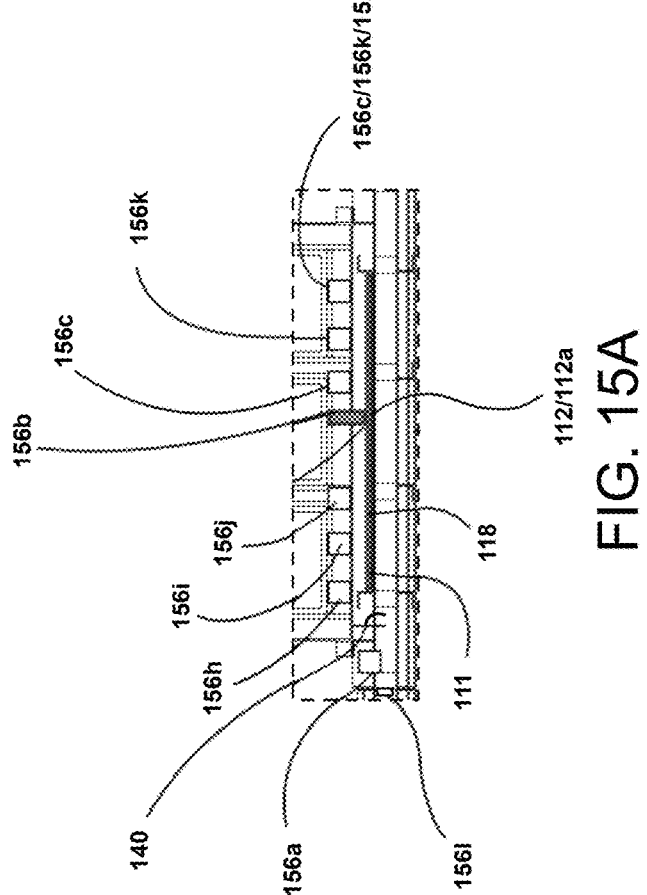
FIG. 15A illustrates an isolated enlarged cross-sectional side view of a testing module on an angulated entrance region, including embodiments with sensors and test plates.
Figure 15B:
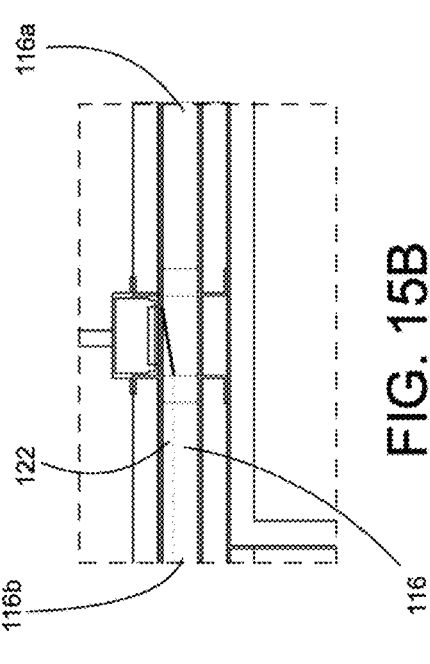
FIG. 15B illustrates an isolated enlarged cross-sectional side view, showing the air injection nozzle turning single-phase to multilayer water.

FIG. 3 illustrates a cross-sectional side view of the angulated entrance region 142 of the testing system 102. Water 116 is shown in the cavity, and the geometrical cross section is shown, wherein the water 116 is seen touching the upper boundary of the cavity. FIG. 4 illustrates an isometric view of an air delivery region 158 module of the angulated entrance region 142 of the testing system with installed air inflow nozzle 160 (as may be appreciated in FIG. 6). As may be appreciated, the geometry is unchanging from the cross-sectional view of FIG. 3, to allow the water to settle into a stratified flow prior to injection of air. This allows the system 102 to mimic the angulated surface of a ship hull, and thereby, the conditions each nozzle may encounter. FIG. 5 illustrates an isometric view of a module of the angulated entrance region 142 of the testing system. FIG. 6 illustrates a cross-sectional side view of a module of the angulared entrance region 142 of the testing system with installed air inflow nozzle 160. FIG. 7 illustrates an isometric view of the angulated diffuser module 104 of the of the testing system. FIG. 8 illustrates a cross-sectional side view of the diffuser module 104 of the of the testing system. FIG. 9 illustrates a cross-sectional side view of the motion nexus module 126 of the of the testing system. FIG. 10 illustrates an isometric view of the motion nexus module 126 feeding into the diffuser module 104 of the of the testing system. FIG. 11 illustrates an isometric view of the degassing chamber 174 of the testing system. FIG. 12 illustrates a cross-sectional side view of the degassing chamber 174 of the testing system. FIG. 13 illustrates an isometric view of an angularly mounted testing module 144 on an angulated entrance region 142. FIG. 14 illustrates a cross-sectional side view of an angularly mounted testing module 144 on the angular entrance region 142. FIG. 15A illustrates an enlarged isolated cross-sectional side view of the angularly mounted testing module 144 on an entrance region 142, including embodiments with sensors 156 and test plates 111 securing a selected specimen 112. As may be appreciated, because the test module is angularly mounted, it is important to have a test plate that is parallel to the test channel 140. Because of this, it is preferred that the test plate be sealed, or substantially sealed at the opening of the test module so that the flow is not impeded by the non-angular sidewalls of the test module, and so that water does not divert out of the angular channel into the test module. FIG. 15B illustrates an enlarged cross-sectional side view, similar to the view shown in FIG. 6, showing the air injection nozzle 160 turning single-phase 116a to multilayer 116b water.

Figure 16:
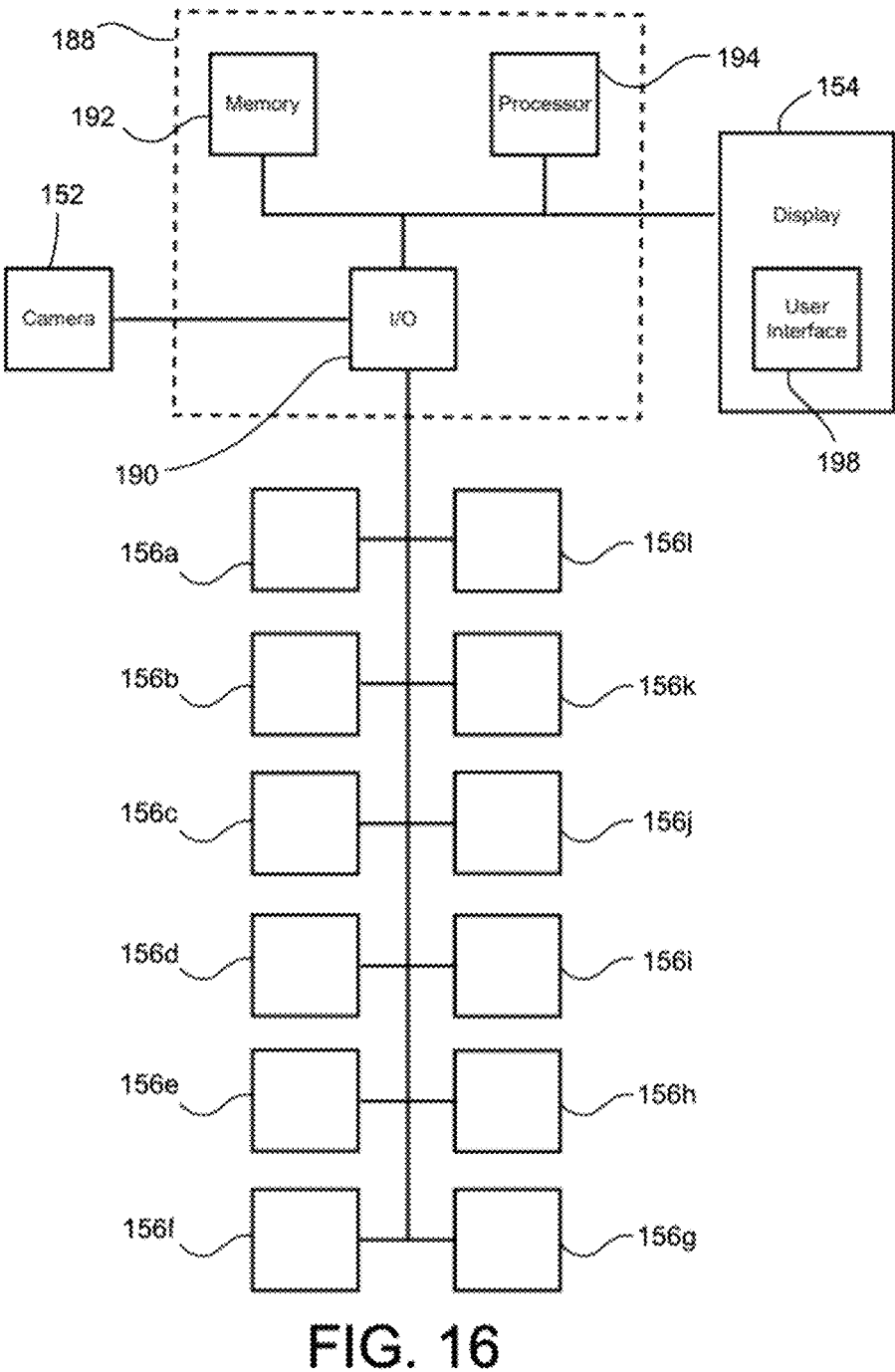
FIG. 16 illustrates a block diagram of the electronic testing module.

FIG. 16 illustrates a block diagram of the electronic device 188 of the testing module 144.

Figure 17:
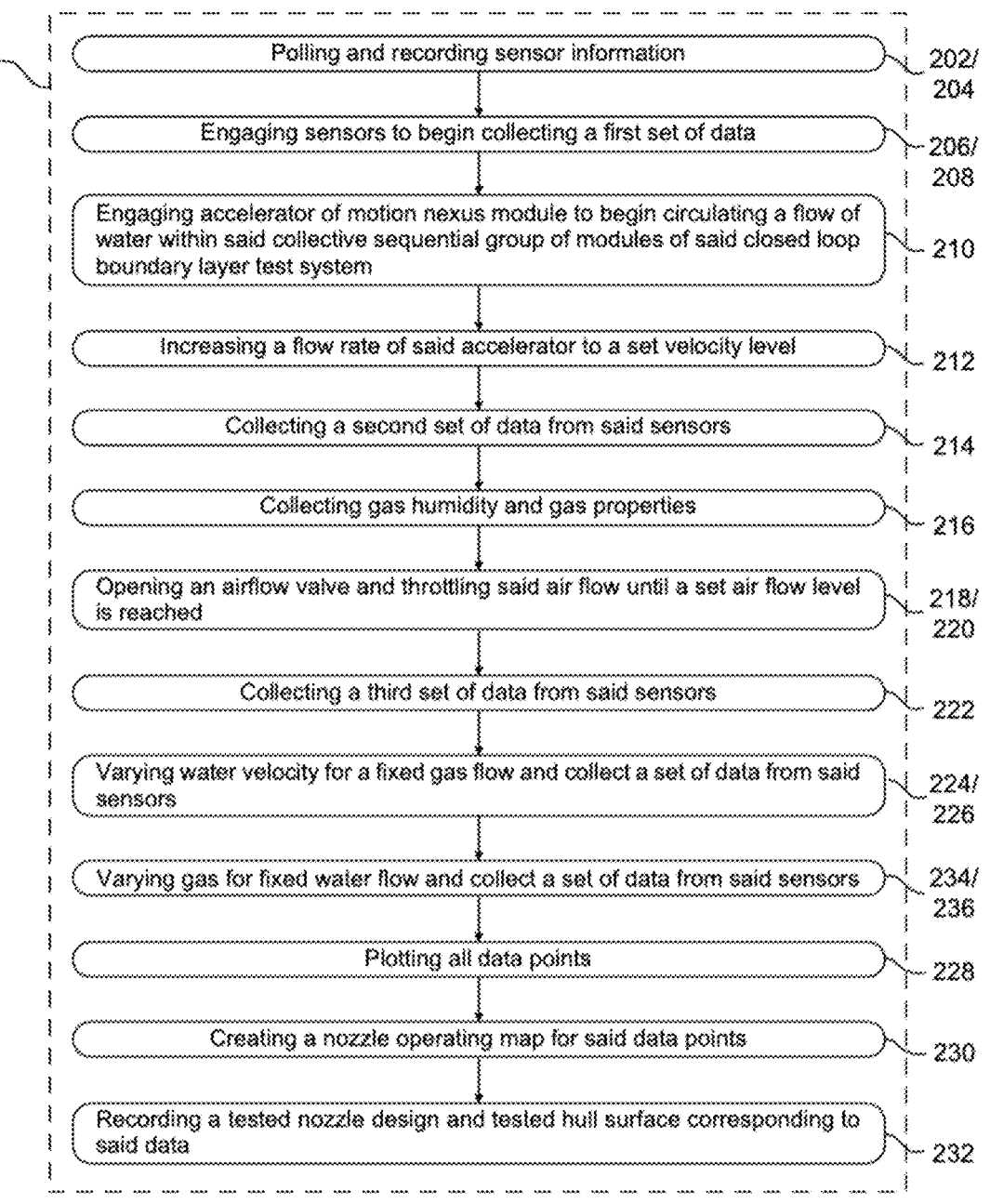
FIG. 17 illustrates a flow chart of a method for the testing system.

FIG. 17 illustrates a flow chart of a computer software operation method 200 for the testing system.

FIG. 18 illustrates a flow chart of a method 300 for the testing system.

In an exemplary embodiment, a boundary layer testing system 100 with enhanced entry region for angulated surfaces is provided. The system 100 comprises a closed loop boundary layer test system 102 defining a collective sequential group of modules 126/134/140/144/174 configured for testing hydrodynamic effects on a selected specimen 112 representative of angulated ship hull designs and features, hull systems and coatings, or air lubrication systems, wherein the selected specimen 112 is immersed continually in a liquid. The collective sequential group of modules includes: i) a means 114 of delivering a fully developed flow of water 116 onto a constructed sub-surface ship component 118, whereby the fully developed flow of water 116 is defined as a stage in the flow of water where characteristics of the boundary layer do not change along a remaining length of a test channel 140, thereby creating a scalable model for observing and recording performance variables of said component in real time; and ii) a means 120 of providing a layer of gas 122 into the controlled water stream 116 onto the submerged ship component 118 to evaluate the effect of said layer of compressed gas 122 on said submerged ship component 118, in real time. The means 120 of providing the layer of gas 122 includes an angulated air delivery region 158 sequentially following an angulated entrance region 142 to thereby inject a gas into the water 116, capable of being single-phase 116a or multi-layer 116b, to convert it to a multi-phase flow of gas and water. The air delivery region 158 includes at least one interchangeable nozzle 160 capable of allowing testing of the effects of air distribution from different nozzles 160 on the selected specimen 112, including angulated portions of said specimen immersed continually in the liquid.

In some embodiments, the means 114 of delivering a fully developed flow of water 116 onto a constructed sub-surface ship component 118 of the boundary layer test system 102 further includes a motion nexus module 126 comprising a water accelerator device 128 to propel the flow of water 116, wherein the motion nexus module 126 includes an inflow area 130 and an outflow area 132. An angulated water stabilization module 134 is coupled to the outflow area 132 of the motion nexus module 126, wherein the water stabilization module 134 comprises a plurality of screens 136 and diffusers 138 to assist in stabilizing the flow of water 116. The system 100 further includes an enclosed angulated linear testing channel 140 having an angulated entrance region 142 and at least one angularly mounted test module 144, wherein the angulated linear testing channel 140 includes at least one means 148 for observing.

In some embodiments, the at least one means 148 for observing comprises a viewing location with a transparent view panel 150.

In some embodiments, the at least one means 148 for observing comprises a viewing location with at least one camera 152 capable of capturing a video feed and displaying said video feed on a screen 154.

In some embodiments, the at least one means 148 for observing includes one or more sensors 156, independently or in combination, such as a pito-static sensor 156a, a pressure sensor 156b, a particle image velocimetry sensor 156c, a temperature sensor 156d, an airflow volume sensor 156e, a plate pressure sensor 156f, an air temperature sensor 156g, a velocity sensor 156h, a Doppler sensor 156i, an acoustic profiling sensor 156j, a photo sensor 156k, and/or a Coriolis meter 156l.

In some embodiments, each test module 144 includes an upper access 170 to said enclosed angulated linear testing channel 140, whereby a test surface 112a and a plurality of sensors 156 can be mounted and observed through at least one view panel 150 with a means 148 for observing in a side of said test module 144.

In some embodiments, the at least one means 148 for observing includes a transparent view panel 150. In other embodiments, the means 148 includes a camera system 152.

In some embodiments, the boundary layer test system 102 further includes a diffuser 104 coupled to an outflow 132 of the angulated linear testing channel 140 to decrease the flow of water 116 exiting the testing channel 140.

In some embodiments, the boundary layer test system 102 further includes a pipe 172 coupling the diffuser 104 to a degassing chamber 174. The degassing chamber 174 has an inflow area 176 and an outflow area 178, and a main body diameter 182 in excess of a diameter 184 of the pipe 172, whereby the increase in diameter results in an increase in volume and thereby a decrease in velocity, which allows bubbles of gas 122 injected through the nozzle 160 in the air delivery region 158 to extricate from the flow of water 116. The outflow area 178 of the degassing chamber 174 is coupled to the inflow area 130 of the motion nexus module 126, forming a continuous water flow circuit.

In some embodiments, the boundary layer test system 102 further includes a water tower 186 coupled to piping 172 in the closed loop system 102 to simulate additional pressure.

In some embodiments, the boundary layer test system 102 includes an electronic device 188 comprising an input interface 190 for receiving sensor data, a memory 192 for storing the received data and computer software 200, and a processor 194 configured to execute the software 200. When executed, the software 200 performs the steps of: polling 202 and recording 204 sensor information; engaging 206 sensors to begin collecting 208 a first data set; engaging 210 the accelerator 128 of the motion nexus module 126 to begin circulating water 116 within the modules 126/134/140/144/174; increasing 212 a flow rate of the accelerator 128; collecting 214 a second data set; collecting 216 gas humidity and gas properties; opening 218 an airflow valve and throttling 220 air flow until a set level is reached; collecting 222 a third data set; varying 224 water velocity for a fixed gas flow and collecting 226 sensor data; varying 234 gas flow for fixed water flow and collecting 236 data; plotting 228 all data points; creating 230 a nozzle operating map; and recording 232 tested nozzle designs and hull surfaces.

In some embodiments, at least one sensor 196 is capable of collecting and reproducing data onto a display device 154 or user interface 198 coupled to the electronic device 188.

In some embodiments, the angularly mounted test module 144 includes a substantially sealed test plate 118*a*, wherein the substantially sealed test plate 118*a* has a lower side in communication with the water and a substantially sealed side open to the test module 144.

In some embodiments, a degree of angulation for the angulated components of the boundary layer test system is calibrated relative to a desired angulation reflective of an angulated ship hull surface, within a range between greater than 1 degree and less than 90 degrees relative to a horizontal plane.

In another exemplary embodiment, an angulated entrance region 142 for a closed loop boundary layer testing system is provided. The angulated entrance region 142 comprises an angulated hydrodynamic stabilization area directly preceding at least one test module 144. The stabilization area defines an elongate angulated rectangular channel having parallel angular top planar surface, angular bottom planar surface, and parallel angulated planar sidewalls. The angulated entrance region 142 includes a uniform geometrical shape along its length configured to provide for settling of water flow. An upper boundary 142*c* at said angular top planar surface is configured to be in communication with said water flow 116 to facilitate testing of completely immersed underwater components. The angulated entrance region 142 is extended to a length of at least triple the length of the test module 144 to achieve a stable boundary layer flow equivalent to pipe flow.

In some embodiments, the angularly mounted test module 144 includes a substantially sealed test plate 118*a*, wherein the substantially sealed test plate 118*a* has a lower side in communication with the water and a substantially sealed side open to the test module 144.

In some embodiments, the degree of angulation for the angulated components is calibrated relative to a desired angulation reflective of an angulated ship hull surface, within a range between greater than 1 degree and less than 90 degrees.

In yet another exemplary embodiment, a method 300 for a boundary layer testing system with enhanced entry region for angulated surfaces is provided. The method 300 comprises the steps of: providing 302 a motion nexus module 126; providing 304 a water stabilization module 134 coupled to the outflow area 132 of the motion nexus module 126; providing 306 an angulated enclosed linear testing channel 140 for monitoring a test surface 112*a*, wherein the channel 140 includes an angulated entrance region 142, an air delivery region 158, and at least one angularly mounted test module 144; providing 308 access to the enclosed angulated linear testing channel 140 in each test module 144 for mounting at least one test surface 112*a* and sensors 156; providing 310 a diffuser 104; providing 312 a pipe 172 to couple the diffuser 104 to a degassing chamber 174 having an inflow 176 and outflow area 178, and a main body diameter 182 greater than that of the pipe 172; and forming 314 a continuous closed loop by coupling the outflow area 178 to the inflow area 130 of the motion nexus module 126.

In some embodiments, the step of providing 308 the access to the enclosed angulated linear testing channel 140 further includes providing the angulated test surface 112*a* and a plurality of sensors 156.

In some embodiments, the step of providing the angularly mounted test module 144 includes providing a substantially sealed test plate 118*a*, wherein the substantially sealed test plate 118*a* has a lower side in communication with the water and a substantially sealed side open to the test module 144.

In some embodiments, a degree of angulation for the angulated components of the system is calibrated relative to a desired angulation reflective of an angulated ship hull surface, within a range between greater than 1 degree and less than 90 degrees.

While there has been shown and described above the preferred embodiment of the instant invention it is to be appreciated that the invention may be embodied otherwise than is herein specifically shown and described and that certain changes may be made in the form and arrangement of the parts without departing from the underlying ideas or principles of this invention as set forth in the Claims appended herewith.

We claim:

1. A boundary layer testing system with enhanced entry region for angulated surfaces, comprising:
   a closed loop boundary layer test system defining a collective sequential group of modules configured for testing hydrodynamic effects on a selected specimen, wherein the selected specimen is representative of ship hull designs and features, hull systems and coatings, or air lubrication systems, and wherein the selected specimen is immersed continually in a liquid within the closed loop boundary layer test system;
   wherein the collective sequential group of modules configured for testing ship hull designs includes:
      i) a means of delivering a fully developed flow of water onto a constructed sub-surface ship component, whereby the fully developed flow of water is defined as a stage in the flow of water where characteristics of the boundary layer do not change along a remaining length of a test channel, thereby creating a scalable model for observing and recording performance variables of said component in real time; and
      ii) a means of providing a layer of gas into the controlled water stream onto the submerged ship component to evaluate an effect of said layer of compressed gas on said submerged ship component, in real time, wherein the means of providing a layer of gas into the flow of water of the boundary layer test system further includes an angulated air delivery region sequentially following an angulated entrance region to thereby inject a gas into water, capable of being single-phase or multi-layer water, to convert it to a multi-phase flow of gas and water, wherein the air delivery region in said entrance region further includes at least one interchangeable nozzle capable of allowing testing of the effects of air distribution from different air distribution nozzles on said selected specimen representative of an angulated portion of said ship hull designs immersed continually in a liquid.

2. The boundary layer testing system with enhanced entry region for angulated surfaces, as recited in claim 1, wherein the means of delivering a fully developed flow of water onto a constructed sub-surface ship component of the boundary layer test system further includes:
   a motion nexus module, including a water accelerator device to propel the flow of water with an inflow area and an outflow area;
   an angulated water stabilization module coupled to said outflow area of said motion nexus module, wherein said water stabilization module comprises a plurality of screens and diffusers to help said flow of water become stable; and
   an enclosed angulated linear testing channel having the angulated entrance region, and at least one angularly mounted test module wherein said angulated linear testing channel includes at least one means for observing.

3. The boundary layer testing system with enhanced entry region for angulated surfaces, as recited in claim 2, wherein said at least one means for observing is a viewing location with a transparent view panel.

4. The boundary layer testing system with enhanced entry region for angulated surfaces, as recited in claim 2, wherein said at least one means for observing is a viewing location with at least one camera capable of capturing a video feed and displaying said video feed on a screen.

5. The boundary layer testing system with enhanced entry region for angulated surfaces, as recited in claim 2, wherein said at least one means for observing includes at least one of:
a pito-static sensor;
a pressure sensor;
a particle image velocimetry sensor;
a temperature sensor;
airflow volume sensor;
plate pressure sensor;
air temperature sensor;
velocity sensor;
Doppler sensor;
acoustic profiling sensor;
photo sensor; and
Coriolis meter.

6. The boundary layer testing system with enhanced entry region for angulated surfaces, as recited in claim 2, wherein each test module in said at least one test module of the boundary layer test system further includes:
an upper access to said enclosed angulated linear testing channel, whereby a test surface and a plurality of sensors can be mounted and observed through at least one view panel with a means for observing in a side of said test module.

7. The boundary layer testing system with enhanced entry region for angulated surfaces, as recited in claim 2, wherein the at least one means for observing at a viewing location includes a transparent view panel.

8. The boundary layer testing system with enhanced entry region for angulated surfaces, as recited in claim 2, wherein the at least one means for observing at a viewing location includes a camera system.

9. The boundary layer testing system with enhanced entry region for angulated surfaces, as recited in claim 2, wherein the boundary layer test system further includes:
a diffuser coupled to an outflow of said angulated linear testing channel to decrease said flow of water exiting said testing channel.

10. The boundary layer testing system with enhanced entry region for angulated surfaces, as recited in claim 9, wherein the boundary layer test system further includes:
a pipe coupling said diffuser to a degassing chamber, wherein said degassing chamber has an inflow area and an outflow area, and a main body diameter in excess of a diameter of said pipe coupling said diffuser to said degassing chamber, whereby the increase in diameter results in an increase in volume and thereby a decrease in velocity, which allows bubbles of the gas injected through a nozzle in said air delivery region to extricate from said flow of water; and
said outflow area of said degassing chamber coupled to said inflow area of said motion nexus module, thereby forming a continuous water flow circuit.

11. The boundary layer testing system with enhanced entry region for angulated surfaces, as recited in claim 2, wherein the boundary layer test system further includes:
a water tower coupled to piping in said closed loop boundary layer test system for simulating additional pressure.

12. The boundary layer testing system with enhanced entry region for angulated surfaces, as recited in claim 2, wherein the angularly mounted test module includes a substantially sealed test plate, wherein said substantially sealed test plate has a lower side in communication with the water, and a substantially sealed side open to said test module.

13. The boundary layer testing system with enhanced entry region for angulated surfaces, as recited in claim 1, wherein the boundary layer test system further includes:
an electronic device comprising: an input interface for receiving sensor data; a memory for storing the received sensor data and computer software; and a processor configured to execute the computer software stored in the memory; wherein the computer software, when executed by the processor, performs the steps of:
polling and recording sensor information;
engaging sensors to begin collecting a first set of data;
engaging accelerator of motion nexus module to begin circulating a flow of water within said collective sequential group of modules of said closed loop boundary layer test system;
increasing a flow rate of said accelerator to a set velocity level;
collecting a second set of data from said sensors;
collecting gas humidity and gas properties;
opening an airflow valve and throttling said air flow until a set air flow level is reached;
collecting a third set of data from said sensors;
varying water velocity for a fixed gas flow and collect a set of data from said sensors;
varying gas for fixed water flow and collect a set of data from said sensors;
plotting all data points;
creating a nozzle operating map for said data points; and
recording a tested nozzle design and tested hull surface corresponding to said data.

14. The boundary layer testing system with enhanced entry region for angulated surfaces, as recited in claim 13, further comprising:
at least one sensor capable of collecting and reproducing collected data onto a display device or user interface coupled to said electronic device.

15. The boundary layer testing system with enhanced entry region for angulated surfaces, as recited in claim 1, wherein a degree of angulation for angulated components is calibrated relative to a desired angulation reflective of an angulated ship hull surface in a range between greater than 1-degree and less than 90-degrees relative to a horizontal plane.

16. An angulated entrance region for a closed loop boundary layer testing system, comprising:
An angulated hydrodynamic stabilization area directly preceding at least one test module, wherein said stabilization area defines an elongate angulated rectangular channel having parallel angular top planar surface and angular bottom planar surface and parallel angulated planar sidewalls;
wherein said hydrodynamic stabilization area includes a uniform geometrical shape along a length of the angulated entrance region, wherein the length is configured to provide for settling of water flow;

an upper boundary at said angular top planar surface configured to be in communication with said water flow to provide for testing of completely immersed underwater components; and wherein said angulated entrance region is extended to a length of at least triple the length of said testing module to provide a stable boundary layer flow specific to ship hulls, thereby providing stabilization and a boundary layer flow that is equivalent to pipe flow.

17. The angulated entrance region for a closed loop boundary layer testing system, as recited in claim 16, wherein the angularly mounted test module includes a substantially sealed test plate, wherein said substantially sealed test plate has a lower side in communication with the water, and a substantially sealed side open to said test module.

18. The angulated entrance region for a closed loop boundary layer testing system, as recited in claim 16, wherein a degree of angulation for angulated components is calibrated relative to a desired angulation reflective of an angulated ship hull surface in a range between greater than 1-degree and less than 90-degrees relative to a horizontal plane.

19. A method for a boundary layer testing system with enhanced entry region for angulated surfaces, comprising:

providing a motion nexus module for propelling a flow of water, wherein said motion nexus module includes a water movement device capable of propelling the flow of water, wherein said motion nexus module includes an inflow area and an outflow area;

providing a water stabilization module for influencing said flow of water to become stratified, wherein said water stabilization module is coupled to said outflow area of said motion nexus module and comprises a plurality of screens and diffusers;

providing an angulated enclosed linear testing channel for monitoring a test surface for condition-based feedback, wherein said enclosed linear testing channel includes an angulated entrance region, an air delivery region, and at least one angularly mounted test module, wherein said angulated enclosed linear testing channel includes at least one area facilitating observation;

providing an access to said angulated enclosed linear testing channel in each test modules in said at least one test module for housing at least one test surface and a plurality of sensors, whereby said at least one test surface and said plurality of sensors can be mounted and observed;

providing a diffuser for decreasing said flow of water exiting said testing channel, wherein said diffuser is coupled to an outflow of said linear testing channel;

providing a pipe to couple said diffuser to a degassing chamber, wherein said degassing chamber has an inflow area and an outflow area, and a main body diameter in excess of a diameter of said pipe coupling said diffuser to said degassing chamber, whereby the increase in diameter results in an increase in volume, which allows bubbles injected through a nozzle in said air delivery region to extricate from said flow of water; and forming a continuous closed loop water flow circuit by coupling said outflow area of said degassing chamber coupled to said inflow area of said motion nexus module.

20. The method for boundary layer testing system with enhanced entry region for angulated surfaces, as recited in claim 19, wherein said step of providing an upper access to said enclosed linear testing channel in each test modules in said at least one test module for housing at least one test surface and a plurality of sensors, also includes providing said at least one angulated test surface and a plurality of sensors.

21. The method for boundary layer testing system with enhanced entry region for angulated surfaces, as recited in claim 19, wherein the step of providing said angularly mounted test module also includes providing a substantially sealed test plate, wherein said substantially sealed test plate has a lower side in communication with the water, and a substantially sealed side open to said test module.

22. The method for boundary layer testing system with enhanced entry region for angulated surfaces, as recited in claim 19, wherein a degree of angulation for angulated components is calibrated relative to a desired angulation reflective of an angulated ship hull surface in a range between greater than 1-degree and less than 90-degrees relative to a horizontal plane.

23. A boundary layer testing system with enhanced entry region for angulated surfaces, comprising:

a closed loop boundary layer test system defining a collective sequential group of modules configured for testing hydrodynamic effects on a selected specimen, wherein the selected specimen is representative of angulated ship hull designs and features, hull systems and coatings, or air lubrication systems, and wherein the selected specimen is immersed continually in a liquid within the closed loop boundary layer test system;

wherein the collective sequential group of modules configured for testing ship hull designs includes:

i) a means of delivering a fully developed flow of water onto a constructed sub-surface ship component, whereby the fully developed flow of water is defined as a stage in the flow of water where characteristics of the boundary layer do not change along a remaining length of a test channel, thereby creating a scalable model for observing and recording performance variables of said component in real time, wherein the means of delivering a fully developed flow of water onto a constructed sub-surface ship component of the boundary layer test system further includes an angulated enclosed linear testing channel having at least one angularly mounted test module and a separate angulated extended entrance region directly preceding said at least one test module, wherein said angulated extended entrance region defines an elongate rectangular channel having parallel top and bottom angulated planar surfaces and parallel planar sidewalls; and ii) a means of providing a layer of gas into the controlled water stream onto the submerged ship component to evaluate an effect of said layer of compressed gas on said submerged ship component, in real time.

24. The boundary layer testing system with enhanced entry region for angulated surfaces, as recited in claim 23, wherein the angularly mounted test module includes a substantially sealed test plate, wherein said substantially sealed test plate has a lower side in communication with the water, and a substantially sealed side open to said test module.

25. The boundary layer testing system with enhanced entry region for angulated surfaces, as recited in claim 23, wherein a degree of angulation for angulated components is calibrated relative to a desired angulation reflective of an angulated ship hull surface in a range between greater than 1-degree and less than 90-degrees relative to a horizontal plane.

\* \* \* \* \*